US012068486B2

(12) United States Patent
Lawrence et al.

(10) Patent No.: US 12,068,486 B2
(45) Date of Patent: Aug. 20, 2024

(54) ELECTROCHEMICAL CELLS WITH ONE OR MORE SEGMENTED CURRENT COLLECTORS AND METHODS OF MAKING THE SAME

(71) Applicant: 24M Technologies, Inc., Cambridge, MA (US)

(72) Inventors: Ryan Michael Lawrence, Cambridge, MA (US); Naoki Ota, Lexington, MA (US)

(73) Assignee: 24M Technologies, Inc., Cambridge, MA (US)

( * ) Notice: Subject to any disclaimer, the term of this patent is extended or adjusted under 35 U.S.C. 154(b) by 121 days.

(21) Appl. No.: 17/339,326

(22) Filed: Jun. 4, 2021

(65) Prior Publication Data
US 2021/0384516 A1    Dec. 9, 2021

Related U.S. Application Data

(60) Provisional application No. 63/034,575, filed on Jun. 4, 2020.

(51) Int. Cl.
*H01M 4/70* (2006.01)
*H01M 50/583* (2021.01)

(52) U.S. Cl.
CPC ............ *H01M 4/70* (2013.01); *H01M 50/583* (2021.01)

(58) Field of Classification Search
CPC ............................. H01M 4/70; H01M 50/583
See application file for complete search history.

(56) References Cited

U.S. PATENT DOCUMENTS

| 3,023,259 A | 2/1962 | Coler et al. |
| 3,148,322 A | 9/1964 | Booe et al. |

(Continued)

FOREIGN PATENT DOCUMENTS

| CN | 1218578 A | 6/1999 |
| CN | 1252170 A | 5/2000 |

(Continued)

OTHER PUBLICATIONS

Machine translation of JP 4658467 B2 (Year: 2011).*

(Continued)

*Primary Examiner* — Matthew T Martin
*Assistant Examiner* — Unique Jenevieve Luna
(74) *Attorney, Agent, or Firm* — Cooley LLP

(57) ABSTRACT

Embodiments described herein relate to electrochemical cells with one or more current collectors divided into segments, and methods of producing the same. A current collector divided into segments comprises a substantially planar conductive material including a connection region and an electrode region. The electrode region includes one or more dividers defining a plurality of electron flow paths. The plurality of electron flow paths direct the flow of electrons from the electrode region to the connection region. In some embodiments, the current collector includes a fuse section disposed between the electrode region and the connection region. In some embodiments, the fuse section can include a thin strip of conductive material, such that the thin strip of conductive material melts at a melting temperature and substantially prevent electron movement between the electrode region and the connection region.

19 Claims, 16 Drawing Sheets

(56) References Cited

U.S. PATENT DOCUMENTS

| | | |
|---|---|---|
| 3,715,697 A | 2/1973 | Them |
| 3,918,995 A | 11/1975 | Palmer et al. |
| 4,992,339 A | 2/1991 | Georgopoulos |
| 5,776,627 A | 7/1998 | Mao et al. |
| 5,879,832 A | 3/1999 | Vu et al. |
| 5,998,051 A | 12/1999 | Poirier et al. |
| 6,168,880 B1 | 1/2001 | Snyder et al. |
| 6,204,635 B1 | 3/2001 | Sullivan |
| 6,544,679 B1 | 4/2003 | Petillo et al. |
| 6,562,517 B1 | 5/2003 | Misra et al. |
| 6,843,388 B1 | 1/2005 | Hollars |
| 7,385,474 B2 | 6/2008 | Kawanishi |
| 7,952,330 B2 | 5/2011 | Mori |
| 8,722,226 B2 | 5/2014 | Chiang et al. |
| 8,722,227 B2 | 5/2014 | Chiang et al. |
| 8,749,341 B2 | 6/2014 | Takeda et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,236,537 B2 | 3/2019 | Hamaguchi et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,665,836 B2 | 5/2020 | Cho et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Tony et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,342,567 B2 | 5/2022 | Chiang et al. |
| 11,462,722 B2 | 10/2022 | Aranami et al. |
| 11,469,065 B2 | 10/2022 | Lawrence et al. |
| 11,476,551 B2 | 10/2022 | Matthew et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 11,631,920 B2 | 4/2023 | Bazzarella et al. |
| 11,646,437 B2 | 5/2023 | Bazzarella et al. |
| 11,652,203 B2 | 5/2023 | Zagars et al. |
| 11,749,804 B2 | 9/2023 | Chen et al. |
| 11,757,129 B2 | 9/2023 | Tan et al. |
| 11,764,353 B2 | 9/2023 | Ota et al. |
| 2001/0038938 A1 | 11/2001 | Takahashi et al. |
| 2004/0028995 A1 | 2/2004 | Shelekhin et al. |
| 2004/0081890 A1 | 4/2004 | Xing et al. |
| 2008/0254355 A1 | 10/2008 | Muraoka et al. |
| 2009/0286139 A1 | 11/2009 | Awano |
| 2009/0315666 A1 | 12/2009 | Ueda et al. |
| 2010/0021821 A1 | 1/2010 | Kim et al. |
| 2010/0047671 A1 | 2/2010 | Chiang et al. |
| 2010/0255351 A1 | 10/2010 | Ijaz et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0121936 A1 | 5/2012 | Baek et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2013/0344367 A1 | 12/2013 | Chiang et al. |
| 2014/0004437 A1 | 1/2014 | Slocum et al. |
| 2014/0011060 A1 | 1/2014 | Yang et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170450 A1 | 6/2014 | Takahashi et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0064517 A1 | 3/2015 | Han et al. |
| 2015/0129081 A1 | 5/2015 | Chiang et al. |
| 2015/0140371 A1 | 5/2015 | Slocum et al. |
| 2015/0140410 A1 | 5/2015 | Kim et al. |
| 2015/0171406 A1 | 6/2015 | Bazzarella et al. |
| 2015/0180033 A1 | 6/2015 | Oyama et al. |
| 2015/0280185 A1 | 10/2015 | Lampe-Onnerud et al. |
| 2015/0280202 A1 | 10/2015 | Lee et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0020042 A1 | 1/2016 | Stanton et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0141593 A1 | 5/2016 | Min et al. |
| 2016/0190544 A1 | 6/2016 | Slocum et al. |
| 2016/0211502 A1 | 7/2016 | Choi et al. |
| 2016/0218375 A1 | 7/2016 | Chiang et al. |
| 2016/0240896 A1 | 8/2016 | Zhang et al. |
| 2016/0268621 A1 | 9/2016 | Chiang et al. |
| 2016/0308218 A1 | 10/2016 | Ota et al. |
| 2016/0315301 A1 | 10/2016 | Kim et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0279108 A1 | 9/2017 | Herle |
| 2017/0288281 A1 | 10/2017 | Chiang et al. |
| 2018/0034090 A1 | 2/2018 | Chiang et al. |

(56) References Cited

U.S. PATENT DOCUMENTS

| | | | |
|---|---|---|---|
| 2018/0102521 A1 | 4/2018 | Cho et al. | |
| 2018/0175428 A1 | 6/2018 | Chiang et al. | |
| 2018/0175445 A1 | 6/2018 | Tan et al. | |
| 2018/0233708 A1 | 8/2018 | Bazzarella et al. | |
| 2018/0233722 A1 | 8/2018 | Holman et al. | |
| 2018/0287220 A1 | 10/2018 | Woodford et al. | |
| 2019/0036101 A1 | 1/2019 | Tyler et al. | |
| 2019/0058184 A1* | 2/2019 | Bazzarella | H01M 50/531 |
| 2019/0245242 A1 | 8/2019 | Tan et al. | |
| 2019/0319460 A1 | 10/2019 | Taylor et al. | |
| 2019/0326562 A1 | 10/2019 | Ota et al. | |
| 2019/0348705 A1 | 11/2019 | Chen et al. | |
| 2019/0355998 A1 | 11/2019 | Chiang et al. | |
| 2019/0363351 A1 | 11/2019 | Ota et al. | |
| 2019/0393477 A1 | 12/2019 | Lawrence et al. | |
| 2020/0014025 A1 | 1/2020 | Zagars et al. | |
| 2020/0044296 A1 | 2/2020 | Chiang et al. | |
| 2020/0106094 A1 | 4/2020 | Ota et al. | |
| 2020/0161688 A1 | 5/2020 | Chaing et al. | |
| 2020/0220118 A1 | 7/2020 | Bazzarella et al. | |
| 2020/0220204 A1 | 7/2020 | Tan et al. | |
| 2020/0259338 A1 | 8/2020 | Taylor et al. | |
| 2020/0321597 A1 | 10/2020 | Zagars et al. | |
| 2020/0321601 A1 | 10/2020 | Slocum et al. | |
| 2020/0358129 A1 | 11/2020 | Chen et al. | |
| 2020/0411825 A1 | 12/2020 | Bazzarella et al. | |
| 2021/0091366 A1 | 3/2021 | Bazzarella et al. | |
| 2021/0167351 A1 | 6/2021 | Zagars et al. | |
| 2021/0226192 A1 | 7/2021 | Aranami et al. | |
| 2021/0249678 A1 | 8/2021 | Chiang et al. | |
| 2021/0249695 A1 | 8/2021 | Aranami et al. | |
| 2021/0265631 A1 | 8/2021 | Chen et al. | |
| 2021/0359527 A1 | 11/2021 | Taylor et al. | |
| 2021/0376380 A1 | 12/2021 | Tan et al. | |
| 2021/0384516 A1 | 12/2021 | Lawrence et al. | |
| 2022/0021019 A1 | 1/2022 | Tan et al. | |
| 2022/0029207 A1 | 1/2022 | Chiang et al. | |
| 2022/0037749 A1 | 2/2022 | Bazzarella et al. | |
| 2022/0052403 A1 | 2/2022 | Chen et al. | |
| 2022/0077445 A1 | 3/2022 | Ota et al. | |
| 2022/0085440 A1 | 3/2022 | Ota et al. | |
| 2022/0093929 A1 | 3/2022 | Chen et al. | |
| 2022/0115710 A1 | 4/2022 | Zagars et al. | |
| 2022/0172916 A1 | 6/2022 | Lawrence et al. | |
| 2022/0173446 A1 | 6/2022 | Chiang et al. | |
| 2022/0200306 A1 | 6/2022 | Kusachi et al. | |
| 2022/0231274 A1 | 7/2022 | Zagars et al. | |
| 2022/0238923 A1 | 7/2022 | Chen et al. | |
| 2022/0263104 A1 | 8/2022 | Chiang et al. | |
| 2022/0263193 A1 | 8/2022 | Chen et al. | |
| 2022/0278427 A1 | 9/2022 | Lawrence et al. | |
| 2022/0285669 A1 | 9/2022 | Doherty et al. | |
| 2022/0352597 A1 | 11/2022 | Chen et al. | |
| 2023/0018078 A1 | 1/2023 | Slocum et al. | |
| 2023/0022329 A1 | 1/2023 | Chen et al. | |
| 2023/0085181 A1 | 3/2023 | Tan et al. | |
| 2023/0090853 A1 | 3/2023 | Tyler et al. | |
| 2023/0118961 A1 | 4/2023 | Chen et al. | |
| 2023/0133464 A1 | 5/2023 | Ota et al. | |
| 2023/0170169 A1 | 6/2023 | Lawrence et al. | |
| 2023/0178707 A1 | 6/2023 | Aranami et al. | |
| 2023/0238562 A1 | 7/2023 | Kusachi et al. | |

FOREIGN PATENT DOCUMENTS

| | | | |
|---|---|---|---|
| CN | 1268254 A | | 9/2000 |
| CN | 1284206 A | | 2/2001 |
| CN | 1571882 A | | 1/2005 |
| CN | 1598994 A | | 3/2005 |
| CN | 101103509 A | | 1/2008 |
| CN | 101595546 A | | 12/2009 |
| CN | 101617419 A | | 12/2009 |
| CN | 102460771 A | | 5/2012 |
| CN | 102483046 A | | 5/2012 |
| CN | 102800525 A | | 11/2012 |
| CN | 106953059 A | | 7/2017 |
| EP | 3279974 | | 2/2018 |
| JP | 4658467 B2 * | | 3/2011 |
| KR | 100778977 B1 | | 11/2007 |
| KR | 10-2013-0064465 | | 6/2013 |
| KR | 10-2014-0012264 A | | 2/2014 |
| KR | 2016-0126157 A | | 11/2016 |
| TW | 533641 B | | 5/2003 |
| WO | WO 2013/132228 | | 9/2013 |
| WO | WO-2016049213 A1 | | 3/2016 |
| WO | WO-2016132119 A1 | | 8/2016 |
| WO | WO 2016/178540 | | 11/2016 |
| WO | WO 2016/205663 | | 12/2016 |
| WO | WO-2019136467 A1 | | 7/2019 |
| WO | WO-2021248012 A1 | | 12/2021 |

OTHER PUBLICATIONS

Partial Supplementary European Search Report for European Application No. 18748587.5, mailed Nov. 6, 2020, 11 pages.

Extended European Search Report for European Application No. 18748587.5, mailed Feb. 8, 2021, 13 pages.

Office Action for U.S. Appl. No. 15/886,281, mailed Dec. 16, 2019, 15 pages.

Office Action for U.S. Appl. No. 15/886,281, mailed Aug. 10, 2020, 26 pages.

International Search Report and Written Opinion for International Application No. PCT/US2018/016406, mailed May 18, 2018, 11 pages.

Office Action for U.S. Appl. No. 15/941,673, mailed Dec. 10, 2019, 7 pages.

International Search Report and Written Opinion for International Application No. PCT/US2018/025375, mailed Jun. 27, 2018, 7 pages.

Office Action for U.S. Appl. No. 16/104,480, mailed Apr. 17, 2020, 10 pages.

Office Action for U.S. Appl. No. 16/048,765, mailed Dec. 11, 2020, 6 pages.

International Search Report and Written Opinion for International Application No. PCT/US2018/044378, mailed Oct. 15, 2018, 8 pages.

Office Action for Chinese Application No. 201880018682.5, mailed Sep. 26, 2021, 7 pages.

Office Action for Chinese Application No. 201880061848.1, mailed Aug. 3, 2021, 23 pages.

International Search Report and Written Opinion for International Application No. PCT/US2021/035922, mailed Sep. 21, 2021, 11 pages.

Cannarella, J. et al., "Stress evolution and capacity fade in constrained lithium-ion pouch cells," Journal of Power Sources, vol. 245, Jul. 2013, pp. 745-751.

Final Office Action for U.S. Appl. No. 15/886,281, mailed on Dec. 30, 2021, 20 Pages.

Final Office Action for U.S. Appl. No. 16/048,765, mailed on Mar. 10, 2021, 9 pages.

International Preliminary Report on Patentability for International Application No. PCT/US2020/049691, mailed Mar. 8, 2022, 7 pages.

International Search Report and Written Opinion for International Application No. PCT/US2020/049691, mailed Dec. 15, 2020, 9 pages.

Non-final Office Action for U.S. Appl. No. 16/048,765, mailed Nov. 15, 2021, 9 pages.

Non-Final Office Action for U.S. Appl. No. 15/886,281, mailed on Jun. 3, 2021, 26 pages.

Notice of Allowance for U.S. Appl. No. 15/886,281, mailed Sep. 12, 2022, 8 pages.

Notice of Allowance for U.S. Appl. No. 16/048,765, dated Jul. 27, 2022, 4 pages.

Notice of Allowance for U.S. Appl. No. 16/048,765, mailed Jun. 15, 2022, 7 pages.

Notice of Allowance for U.S. Appl. No. 17/078,814, mailed Oct. 31, 2022, 9 pages.

(56) References Cited

OTHER PUBLICATIONS

Notice of Allowance for U.S. Appl. No. 17/078,814, mailed Sep. 21, 2022, 8 pages.
Office Action for Chinese Application No. 201880018682.5, mailed Jul. 19, 2022, 28 pages.
Office Action for Chinese Application No. CN201880061848.1 dated Jun. 6, 2022, 20 pages.
Office Action for U.S. Appl. No. 17/078,814, mailed May 13, 2022, 20 pages.
International Preliminary Report on Patentability for International Application No. PCT/US2021/035922 mailed Dec. 15, 2022, 8 pages.
Rejection Decision for Chinese Application No. 20188018682 dated May 24, 2023, 13 pages.
Non-Final Office Action for U.S. Appl. No. 17/944,602 dated Oct. 13, 2023, 14 pages.
Non-Final Office Action for U.S. Appl. No. 18/161,787 dated Nov. 14, 2023, 13 pages.
Final Office Action for U.S. Appl. No. 17/944,602 dated Mar. 29, 2024, 11 pages.
Notice of Allowance for U.S. Appl. No. 18/161,787 dated Apr. 3, 2024, 8 pages.

* cited by examiner

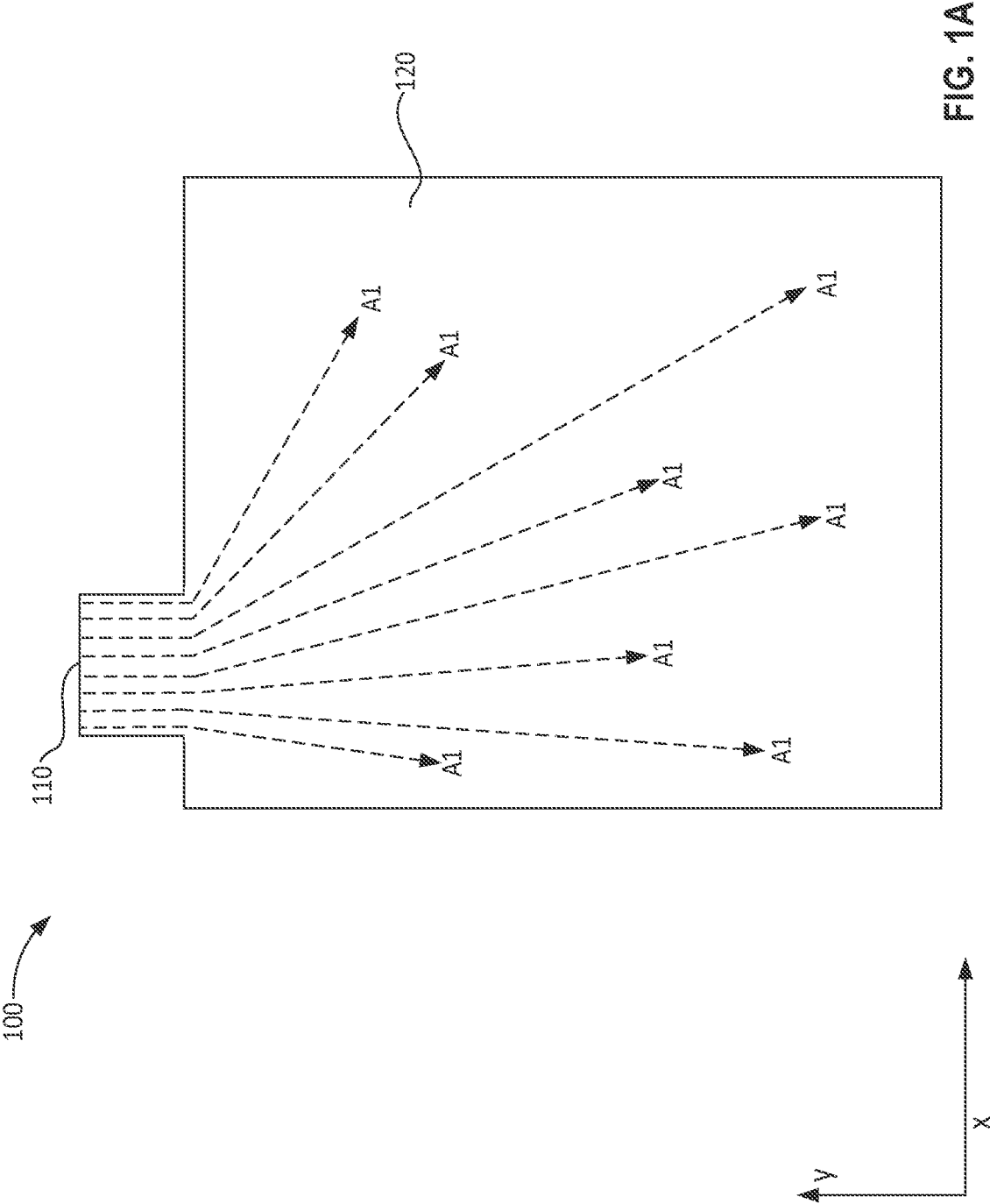

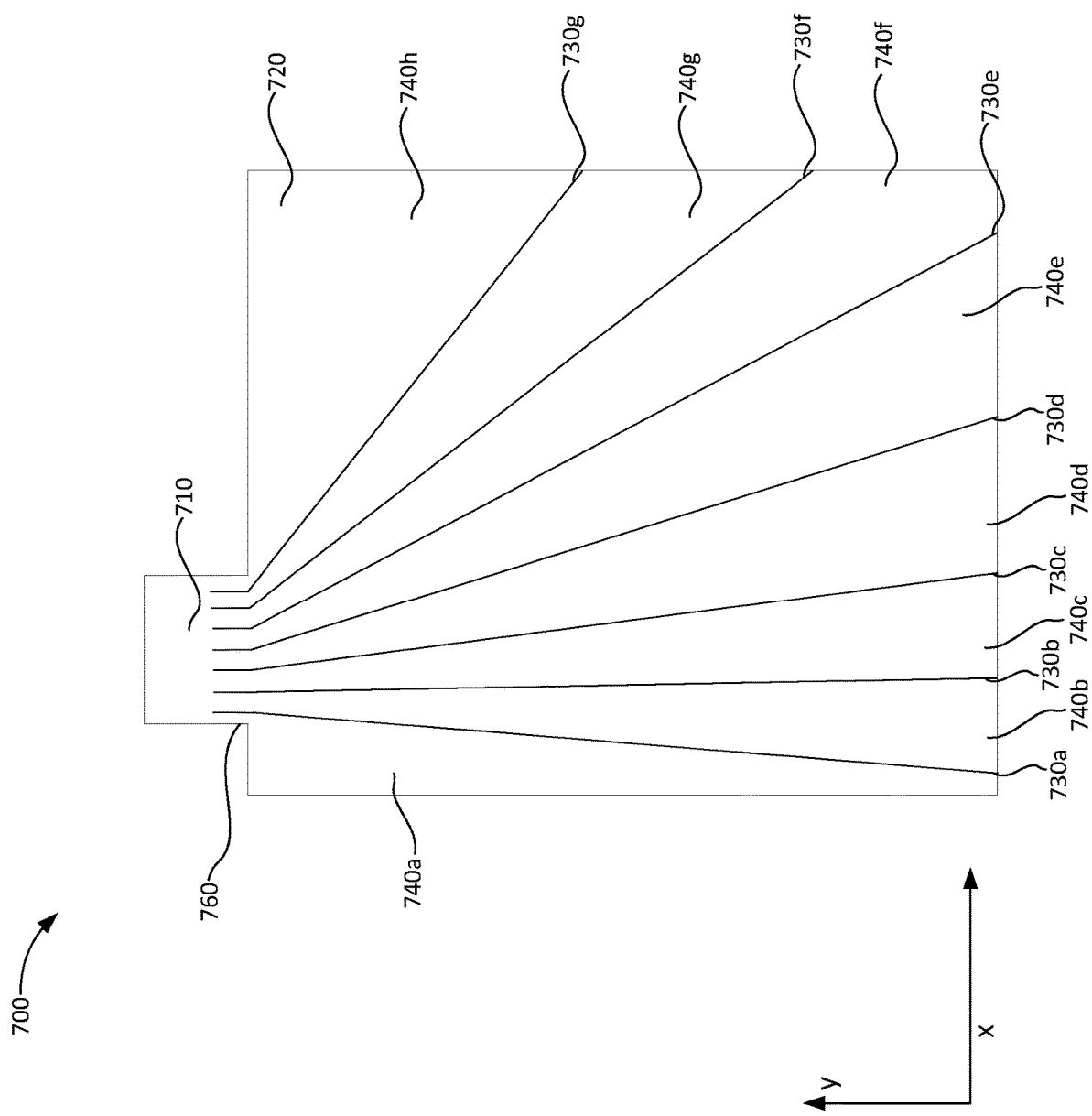

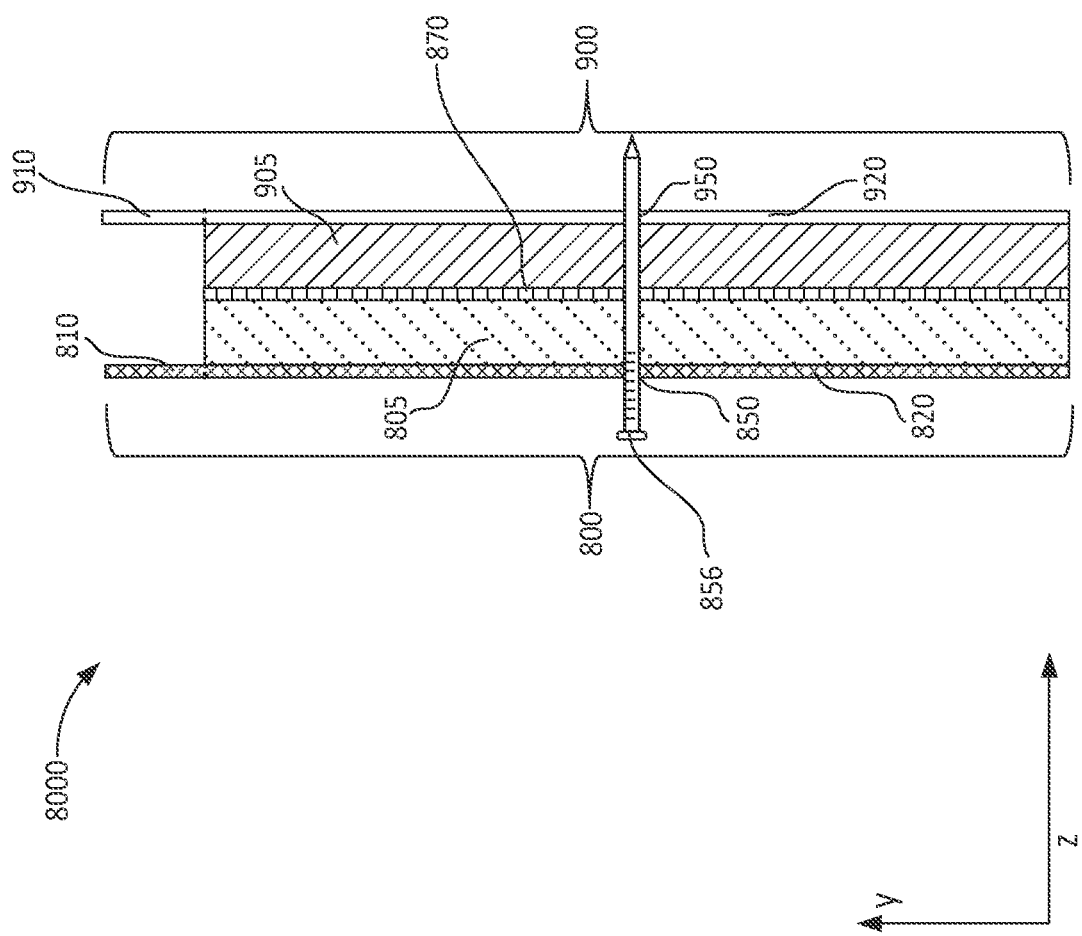

ELECTROCHEMICAL CELLS WITH ONE OR MORE SEGMENTED CURRENT COLLECTORS AND METHODS OF MAKING THE SAME

CROSS-REFERENCE TO RELATED APPLICATIONS

The application claims priority to and the benefit of U.S. Provisional Patent Application Ser. No. 63/034,575 entitled, "Electrochemical Cells with One or More Segmented Current Collectors and Methods of Making the Same," filed Jun. 4, 2020, the disclosure of which is incorporated herein by reference in its entirety.

TECHNICAL FIELD

Embodiments described herein relate to thermal runaway prevention in electrochemical cells.

BACKGROUND

Thermal runaway in electrochemical cells can have destructive and dangerous consequences. Thermal runaway occurs when the rate of internal heat generation in an electrochemical cell or at a point or a portion in the electrochemical cell exceeds the rate at which heat can be expelled. Thermal runaway can destroy electroactive material and can potentially be hazardous or life-threatening to any person in the vicinity of the electrochemical cell. While thermal runaway can occur in many different electrochemical cell chemistries, thermal runaway is often associated with lithium ion electrochemical cells due to the high reactivity of lithium ion electrochemical cell components. If the temperature in the electrochemical cell or in a portion of the electrochemical cell is high enough, fires and explosions can occur. A common cause of thermal runaway in electrochemical cells is a short circuit event. When an electronically conductive piece of material makes electrical contact with both the anode and the cathode, high and sustained currents may occur, causing a fast increase in temperature and thermal runaway. Built-in safety mechanisms are an important innovation to protect against thermal runaway in electrochemical cells.

SUMMARY

Embodiments described herein relate to electrochemical cells with one or more current collectors divided into segments, and methods of producing the same. A current collector divided into segments comprises a substantially planar conductive material including a connection region and an electrode region. The electrode region includes one or more dividers defining a plurality of electron flow paths. The plurality of electron flow paths direct the flow of electrons between the electrode region and the connection region. In some embodiments, the current collector includes a fuse section disposed between the electrode region and the connection region. In some embodiments, the fuse section can include a thin strip of conductive material, such that the thin strip of conductive material melts at a melting temperature and substantially prevent electron movement between the electrode region and the connection region. In some embodiments, the thin strip of conductive material can melt at temperatures greater than about 200° C. In some embodiments, the substantially planar current collector can have an x-axis and a y-axis, and the divider or plurality of dividers can substantially prohibit the movement of electrons in the x-direction with a constant y-value.

BRIEF DESCRIPTION OF THE DRAWINGS

FIGS. 1A-1B show a current collector of a typical electrochemical cell subject to a short circuit event.

FIG. 7 is an illustration of a current collector with a short circuit thermal runaway prevention mechanism, according to an embodiment.

FIG. 8 is an illustration of an electrochemical cell with a short circuit thermal runaway prevention mechanism, according to an embodiment.

DETAILED DESCRIPTION

Figure 1B:
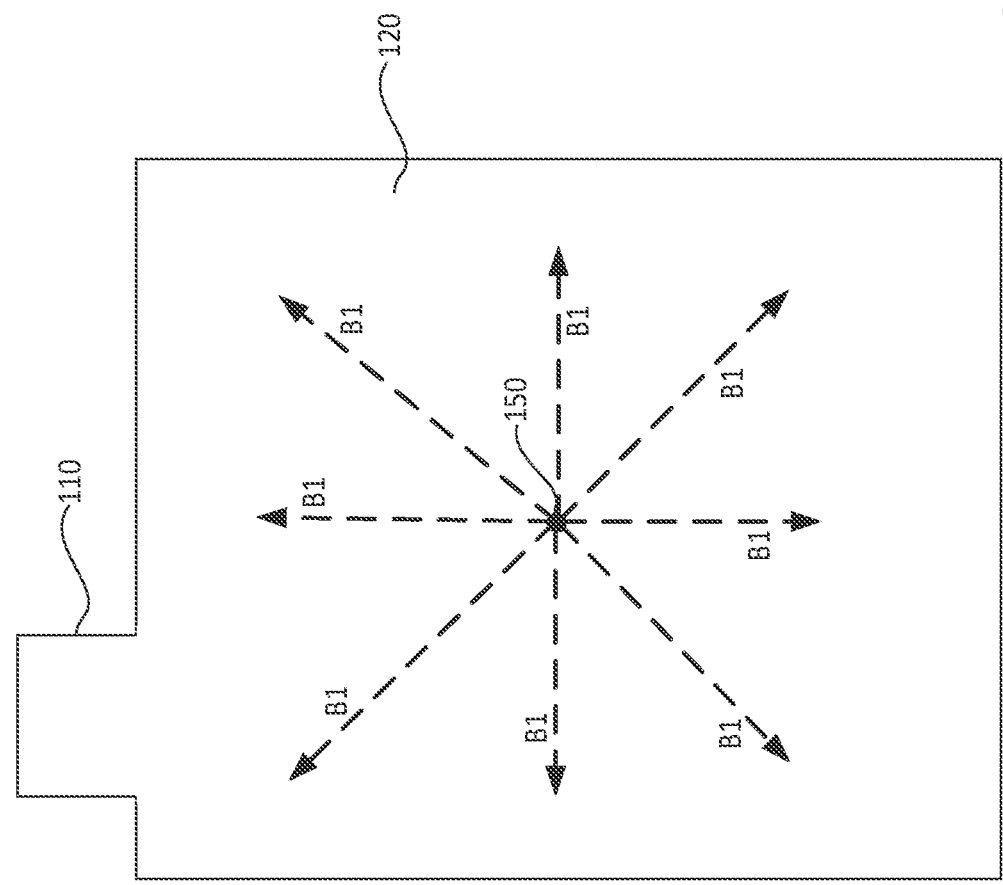

Embodiments described herein relate to electrochemical cells with one or more current collectors divided into segments, and methods of producing the same. Thermal runaway in electrochemical cells can often be caused by a short circuit event that directs the flow of electrons through a short circuit point. An example of this behavior is shown in FIGS. 1A-1B. FIG. 1A shows a current collector 100 of a typical electrochemical cell (not shown) under normal operation. The current collector 100 includes a connection region 110 and an electrode region 120. The connection region 110 connects the current collector 100 and the electrochemical cell to an external circuit, while an electrode material (not shown) is disposed on the electrode region 120. As shown, the current collector 100 acts as a cathode current collector. During a typical discharge, electrons from the anode current collector are transferred via an external circuit to the cathode current collector 100. Electrons follow flow paths µl, migrating from the external circuit, to the connection region 110 and the electrode region 120. For reference, FIGS. 1A-1B include a coordinate plot with an x-axis and a y-axis. As shown, the current collector 100 is depicted with the connection region 110 at a higher y-value than electrode region 120.

FIG. 1B shows the current collector 100 subject to a short circuit event at a short circuit point 150. Since electrons follow a path of least resistance, electrons from the anode and the anode current collector (not shown) migrate through the short circuit point 150 to the cathode current collector 100. Electrons migrate from the short circuit point 150 to the electrode region 120 along electron flow paths B1 (depicted as thicker lines than electron flow paths µl to represent greater electron flow density), where the electrons combine with migrating ions in the cathode crystal structure. The current collector 100 includes no barriers or obstacles to electron movement, so electrons are free to follow a path of least resistance and move freely both in the x-direction and in the y-direction. With the electrons able to move unrestricted through the current collector 100, electrons can move in any number of direct electron flow paths B1 from the short circuit point 150. In other words, resistivity of the current collector 100 is substantially isotropic. The unrestricted flow of current through short circuit point 150 can excite the material of the current collector 100 and can cause a rapid rise in temperature in the current collector 100 and the electrochemical cell, potentially leading to thermal runaway. Combining the high temperature with the reactivity of the electroactive species in the electrochemical cell can lead to ignition, fires, and/or explosions.

The use of thermal runaway protection mechanisms in electrochemical cells can lower the risk of ignition. Lower ignition risk is an economic advantage as well as a safety advantage. Thermal runaway prevention mechanisms can prevent electrochemical material from being destroyed by high temperatures or ignition events. This can be economically favorable, as fewer replacement parts become necessary. Additionally, thermal runaway prevention can make transporting fully assembled electrochemical cells safer. Cell transport is often a source of safety concerns, as the electrochemical cells are prone to ignition, fires, and/or explosion due to the jostling and disturbance caused by transport. Incorporation of thermal runaway protection can increase the favorability of transporting fully assembled cells, reducing the need for on-site cell construction.

Several mechanisms currently exist for preventing thermal runaway in electrochemical cells. A common strategy is to add insulating materials to electrochemical cells. The insulating materials can be added either to the interior of a single electrochemical cell or to layers between electrochemical cells connected in series or in parallel. Issues emerge with the use of insulating materials, both in terms of energy/power density and specific energy/power. Most applications that include the use of one electrochemical cell or a system of electrochemical cells have a limited amount of space to be used for electrochemical cells. For example, electric vehicles often employ a standard-sized case, in which the electrochemical cells are housed. When a portion of space is occupied by insulating material that could otherwise be occupied by electroactive material, the energy density and power density of the electrochemical cell decreases. Even in applications where space is of minimal concern, insulating material nevertheless adds mass to the electrochemical cell or electrochemical cell system. This is added mass that does not increase the amount of energy in the electrochemical cell. Therefore, the insulating material hampers the specific energy and specific power of the electrochemical cell or electrochemical cell system.

By dividing a current collector into multiple segments via one or more dividers, the flow of electrons can be guided, such that the path an electron must follow to or from a short circuit point is no longer a direct line. Dividing a current collector of an electrochemical cell can make paths to the short circuit point more tortuous. Following an indirect path to the short circuit point can reduce the short circuit current in the electrochemical cell. This reduction in short circuit current can limit and slow down temperature increase. Furthermore, an electrochemical cell with an internal or built-in thermal runaway protection mechanism can address the problem of thermal runaway without increasing the mass of the electrochemical cell.

In some embodiments, the segmented current collector design can be applied to an anode current collector. In some embodiments, the segmented current collector design can be applied to a cathode current collector. In some embodiments, the segmented current collector design can be applied to both the anode current collector and the cathode current collector. In some embodiments, the segmented current collector design can be applied to a stacked prismatic electrochemical cell, a wound prismatic electrochemical cell, a cylindrical electrochemical cell, or any other electrochemical cell design.

In some embodiments, current collectors described herein can include a conductive material in the form of a substrate, sheet or foil, or any other form factor. In some embodiments, the current collector can include a metal such as aluminum, copper, lithium, nickel, stainless steel, tantalum, titanium, tungsten, vanadium, or a mixture, combinations or alloys thereof. In other embodiments, the current collector can include a non-metal material such as carbon, carbon nanotubes, or a metal oxide (e.g., TiN, $TiB_2$, $MoSi_2$, n-$BaTiO_3$, $Ti_2O_3$, $ReO_3$, $RuO_2$, $IrO_2$, etc.). In some embodiments, the current collector can include a conductive coating disposed on any of the aforementioned metal and non-metal materials. In some embodiments, the conductive coating can include a carbon-based material, conductive metal and/or non-metal material, including composites or layered materials.

In some embodiments, the electrochemical cells described herein can include a semi-solid cathode and/or a semi-solid anode. In some embodiments, the semi-solid electrodes described herein can be binderless and/or can use less binder than is typically used in conventional battery manufacturing. The semi-solid electrodes described herein can be formulated as a slurry such that the electrolyte is included in the slurry formulation. This is in contrast to conventional electrodes, for example calendered electrodes, where the electrolyte is generally added to the electrochemical cell once the electrochemical cell has been disposed in a container, for example, a pouch or a can.

In some embodiments, the electrode materials described herein can be a flowable semi-solid or condensed liquid composition. In some embodiments, a flowable semi-solid electrode can include a suspension of an electrochemically active material (anodic or cathodic particles or particulates), and optionally an electronically conductive material (e.g., carbon) in a non-aqueous liquid electrolyte. In some embodiments, the active electrode particles and conductive particles can be co-suspended in an electrolyte to produce a semi-solid electrode. In some embodiments, electrode materials described herein can include conventional electrode materials (e.g., including lithium metal).

Examples of current collectors, electrodes, electrolyte solutions, and methods and materials that can be used for preparing the same are described in U.S. Pat. No. 9,484,569 (hereafter "the '569 patent"), filed Mar. 15, 2013, entitled "Electrochemical Slurry Compositions and Methods for Preparing the Same," U.S. Patent Publication No. 2016/0133916 (hereafter "the '916 Publication"), filed Nov. 4, 2015, entitled "Electrochemical Cells Having Semi-Solid Electrodes and Methods of Manufacturing the Same," U.S. Pat. No. 8,993,159 (hereafter "the '159 patent"), filed Apr. 29, 2013, entitled "Semi-Solid Electrodes Having High Rate Capability," and U.S. Pat. No. 10,181,587 (hereafter "the '587 patent"), filed Jun. 17, 2016, entitled "Single Pouch Battery Cells and Methods of Manufacture," the entire disclosures of which are hereby incorporated by reference herein.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "semi-solid" refers to a material that is a mixture of liquid and solid phases, for example, such as a particle suspension, a slurry, a colloidal suspension, an emulsion, a gel, or a micelle.

Figure 2:
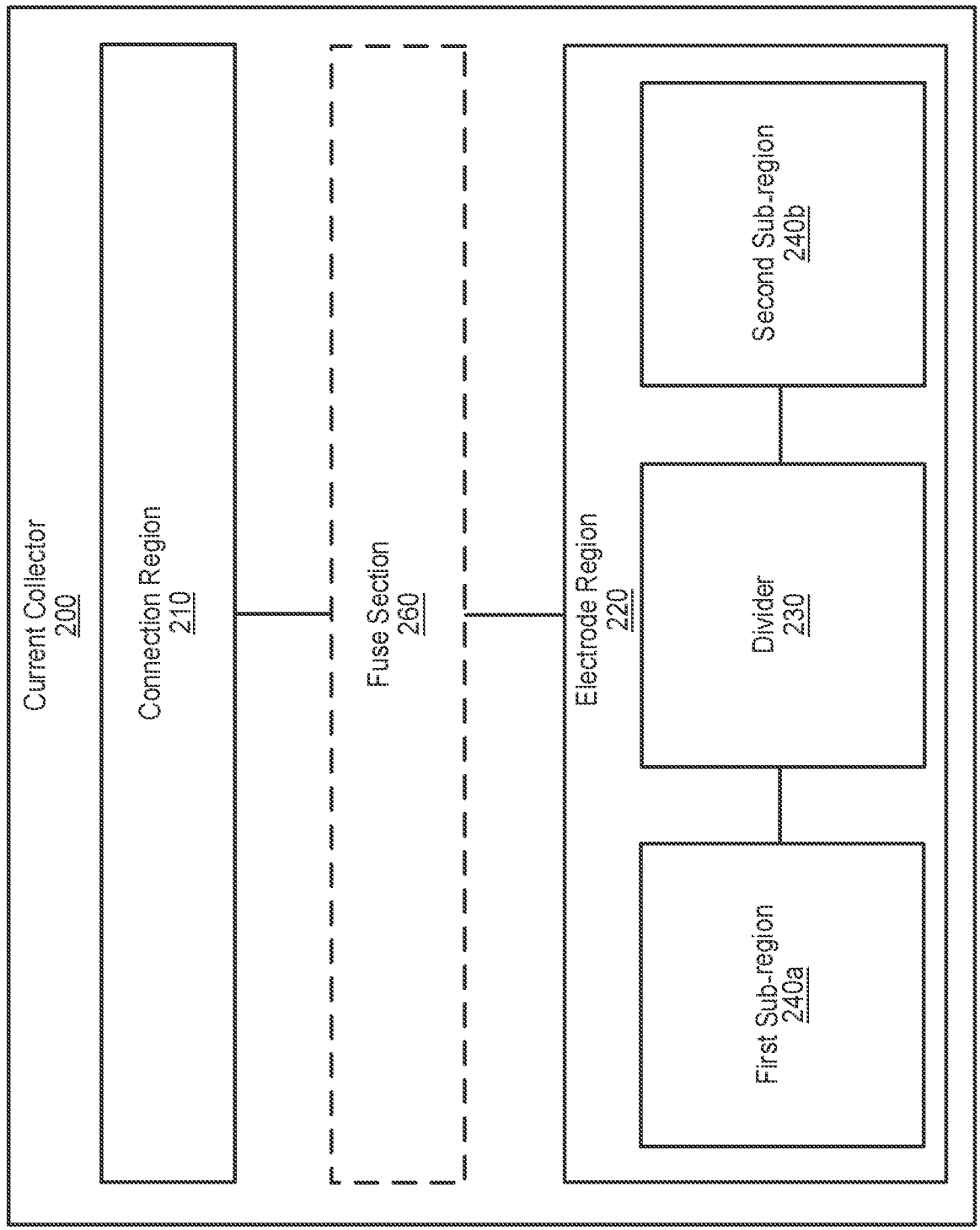
FIG. 2 is a schematic diagram of a current collector with a short circuit thermal runaway prevention mechanism, according to an embodiment.

FIG. 2 is a schematic illustration of a current collector 200 with a thermal runaway prevention mechanism. The current collector 200 includes a connection region 210 and an electrode region 220. The connection region 210 electronically connects the current collector 200 to an external circuit (not shown). An electrode material (not shown) is disposed on the electrode region 220. The electrode region 220 includes a divider 230, which divides the electrode region 220 into a first sub-region 240a and a second sub-region 240b (collectively referred to as sub-regions 240). In some embodiments, the current collector 200 can include a fuse section 260 between the connection region 210 and the electrode region 220.

In some embodiments, the connection region 210 and the electrode region 220 can be two different portions of the same piece of material. In some embodiments, the connection region 210 can be coupled directly to the electrode region 220. In some embodiments, the connection region 210 can be coupled to the electrode region 220 via mechanical compression, use of an electrically conductive paste, chemical joining, welding, brazing, soldering, crimping, or any other suitable coupling means.

In some embodiments, the divider 230 can simply be an incision in the electrode region 220 that prevents the movement of electrons in a direct path from the first sub-region 240a to the second sub-region 240b. In some embodiments, the first sub-region 240a can be electronically isolated from the second sub-region 240b. In some embodiments, the first sub-region 240a can be electronically insulated from the second sub-region 240b. In some embodiments, the first sub-region 240a is not directly coupled to the second sub-region 240b. In some embodiments, the divider 230 can be cut with a simple blade. In some embodiments, the divider 230 can be cut via die cutting, laser cutting, or any other subtractive processing techniques. In some embodiments, the divider 230 can be implemented in the current collector 200 via electrodeposition, silk screening, or any other suitable additive processing technique. In some embodiments, the divider 230 can extend to an edge of the electrode region 220. In some embodiments, the divider 230 can be an incision that does not extend to either edge of the electrode region 220. As shown, the electrode region 220 includes one divider 230. In some embodiments, the electrode region 220 can include a plurality of dividers 230.

In some embodiments, the electrode region 220 can include two dividers 230, three dividers 230, four dividers 230, five dividers 230, six dividers 230, seven dividers 230, eight dividers 230, nine dividers 230, or ten dividers 230. In some embodiments, the electrode region 220 can include at least about one divider 230, at least about two dividers 230, at least about three dividers 230, at least about four dividers 230, at least about five dividers 230, at least about six dividers 230, at least about seven dividers 230, at least about eight dividers 230, at least about nine dividers 230, at least about ten dividers 230, at least about 20 dividers 230, at least about 30 dividers 230, at least about 40 dividers 230, at least about 50 dividers 230, at least about 60 dividers 230, at least about 70 dividers 230, at least about 80 dividers 230, or at least about 90 dividers 230. In some embodiments, the electrode region 220 can include no more than about 100 dividers 230, no more than about 90 dividers 230, no more than about 80 dividers 230, no more than about 70 dividers 230, no more than about 60 dividers 230, no more than about 50 dividers 230, no more than about 40 dividers 230, no more than about 30 dividers 230, no more than about 20 dividers 230, no more than about ten dividers 230, no more than about nine dividers 230, no more than about eight dividers 230, no more than about seven dividers 230, no more than about six dividers 230, no more than about five dividers 230, no more than about four dividers 230, no more than about three dividers 230, or no more than about two dividers 230. Combinations of the above-referenced numbers of dividers 230 are also possible (e.g., at least about one divider 230 and no more than about 100 dividers 230 or at least about five dividers 230 and no more than about 50 dividers 230), inclusive of all values and ranges therebetween. In some embodiments, the electrode region 220 can include about one divider 230, about two dividers 230, about three dividers 230, about four dividers 230, about five dividers 230, about six dividers 230, about seven dividers 230, about eight dividers 230, about nine dividers 230, about ten dividers 230, about 20 dividers 230, about 30 dividers 230, about 40 dividers 230, about 50 dividers 230, about 60 dividers 230, about 70 dividers 230, about 80 dividers 230, about 90 dividers 230, or about 100 dividers 230.

As shown, the electrode region 220 includes two sub-regions 240. In some embodiments, the electrode region 220 can include three sub-regions 240, four sub-regions 240, five sub-regions 240, six sub-regions 240, seven sub-regions 240, eight sub-regions 240, nine sub-regions 240, or ten sub-regions 240. In some embodiments, the electrode region 220 can include at least about two sub-regions 240, at least about three sub-regions 240, at least about four sub-regions 240, at least about five sub-regions 240, at least about six sub-regions 240, at least about seven sub-regions 240, at least about eight sub-regions 240, at least about nine sub-regions 240, at least about ten sub-regions 240, at least about 20 sub-regions 240, at least about 30 sub-regions 240, at least about 40 sub-regions 240, at least about 50 sub-regions 240, at least about 60 sub-regions 240, at least about 70 sub-regions 240, at least about 80 sub-regions 240, or at least about 90 sub-regions 240. In some embodiments, the electrode region 220 can include no more than about 100 sub-regions 240, no more than about 90 sub-regions 240, no more than about 80 sub-regions 240, no more than about 70 sub-regions 240, no more than about 60 sub-regions 240, no more than about 50 sub-regions 240, no more than about 40 sub-regions 240, no more than about 30 sub-regions 240, no more than about 20 sub-regions 240, no more than about ten sub-regions 240, no more than about nine sub-regions 240, no more than about eight sub-regions 240, no more than about seven sub-regions 240, no more than about six sub-regions 240, no more than about five sub-regions 240, no more than about four sub-regions 240, or no more than about three sub-regions 240. Combinations of the above-referenced numbers of sub-regions 240 are also possible (e.g., at least about two sub-regions 240 and no more than about 100 sub-regions or at least about five sub-regions 240 and no more than about 50 sub-regions 240), inclusive of all values and ranges therebetween. In some embodiments, the electrode region 220 can include about two sub-regions 240, about three sub-regions 240, about four sub-regions 240, about five sub-regions 240, about six sub-regions 240, about seven sub-regions 240, about eight sub-regions 240, about nine sub-regions 240, about ten sub-regions 240, about 20 sub-regions 240, about 30 sub-regions 240, about 40 sub-regions 240, about 50 sub-regions 240, about 60 sub-regions 240, about 70 sub-regions 240, about 80 sub-regions 240, about 90 sub-regions 240, or about 100 sub-regions 240. In some embodiments, one or more of the sub-regions 240 can be directly coupled to the connection region 210. For example, a "direct coupling" can refer to two pieces of material physically touching each other. In some embodiments, one or more of the sub-regions 240 can be part of the same piece of material as the connection region 210.

In some embodiments, the fuse section 260 can include one or more thin portions of material (or fuses) that connect the connection region 210 to the electrode region 220. In some embodiments, the fuses can be composed of the same material as the connection region 210 and the electrode region 220. In some embodiments, the fuses can be sufficiently thin, such that they increase in temperature much faster than the bulk materials of the connection region 210 or the electrode region 220. This faster increase in temperature is due to bottlenecking of the electrons through the thin fuses and the resulting excitation of the atoms in the fuses. In some embodiments, the fuses can be composed of a material with a lower melting temperature than the melting temperature of the connection region 210 or the electrode region 220. In some embodiments, the fuses can melt at a prescribed temperature or temperature range, such that further contact between the connection region 210 and the electrode region 220 is eliminated or substantially eliminated.

In some embodiments, the fuses can melt at a temperature of at least about 100° C., at least about 150° C., at least about 200° C., at least about 250° C., at least about 300° C., at least about 350° C., at least about 400° C., at least about 450° C., at least about 500° C., at least about 550° C., at least about 600° C., at least about 650° C., at least about 700° C., at least about 750° C., at least about 800° C., at least about 850° C., at least about 900° C., at least about 950° C., at least about 1,000° C., at least about 1,050° C., at least about 1,100° C., at least about 1,150° C., at least about 1,200° C., at least about 1,250° C., at least about 1,300° C., at least about 1,350° C., at least about 1,400° C., or at least about 1,450° C. In some embodiments, the fuses can melt at a temperature of no more than about 1,500° C., no more than about 1,450° C., no more than about 1,400° C., no more than about 1,350° C., no more than about 1,300° C., no more than about 1,250° C., no more than about 1,200° C., no more than about 1,150° C., no more than about 1,100° C., no more than about 1,050° C., no more than about 1,000° C., no more than about 950° C., no more than about 900° C., no more than about 850° C., no more than about 800° C., no more than about 750° C., no more than about 700° C., no more than about 650° C., no more than about 600° C., no more than about 550° C., no more than about 500° C., no more than about 450° C., no more than about 400° C., no more than about 350° C., no more than about 300° C., no more than about 250° C., no more than about 200° C., or no more than about 150° C. Combinations of the above-referenced fuse melting temperature are also possible (e.g., at least about 100° C. and no more than about 1,500° C. or at least about 200° C. and no more than about 600° C.), inclusive of all values and ranges therebetween. In some embodiments, the fuses can melt at a temperature of about 100° C., about 150° C., about 200° C., about 250° C., about 300° C., about 350° C., about 400° C., about 450° C., about 500° C., about 550° C., about 600° C., about 650° C., about 700° C., about 750° C., about 800° C., about 850° C., about 900° C., about 950° C., about 1,000° C., about 1,050° C., about 1,100° C., about 1,150° C., about 1,200° C., about 1,250° C., about 1,300° C., about 1,350° C., about 1,400° C., about 1,450° C., or about 1,500° C.

In some embodiments, the average temperature of the current collector 200 can increase due to a short circuit event by less than about 100° C., less than about 95° C., less than about 90° C., less than about 85° C., less than about 80° C., less than about 75° C., less than about 70° C., less than about 65° C., less than about 60° C., less than about 55° C., less than about 50° C., less than about 45° C., less than about 40° C., less than about 35° C., less than about 30° C., less than about 25° C., less than about 20° C., less than about 15° C., less than about 10° C., less than about 5° C., less than about 4° C., less than about 3° C., less than about 2° C., or less than about 1° C., inclusive of all values and ranges therebetween.

Figure 3A:
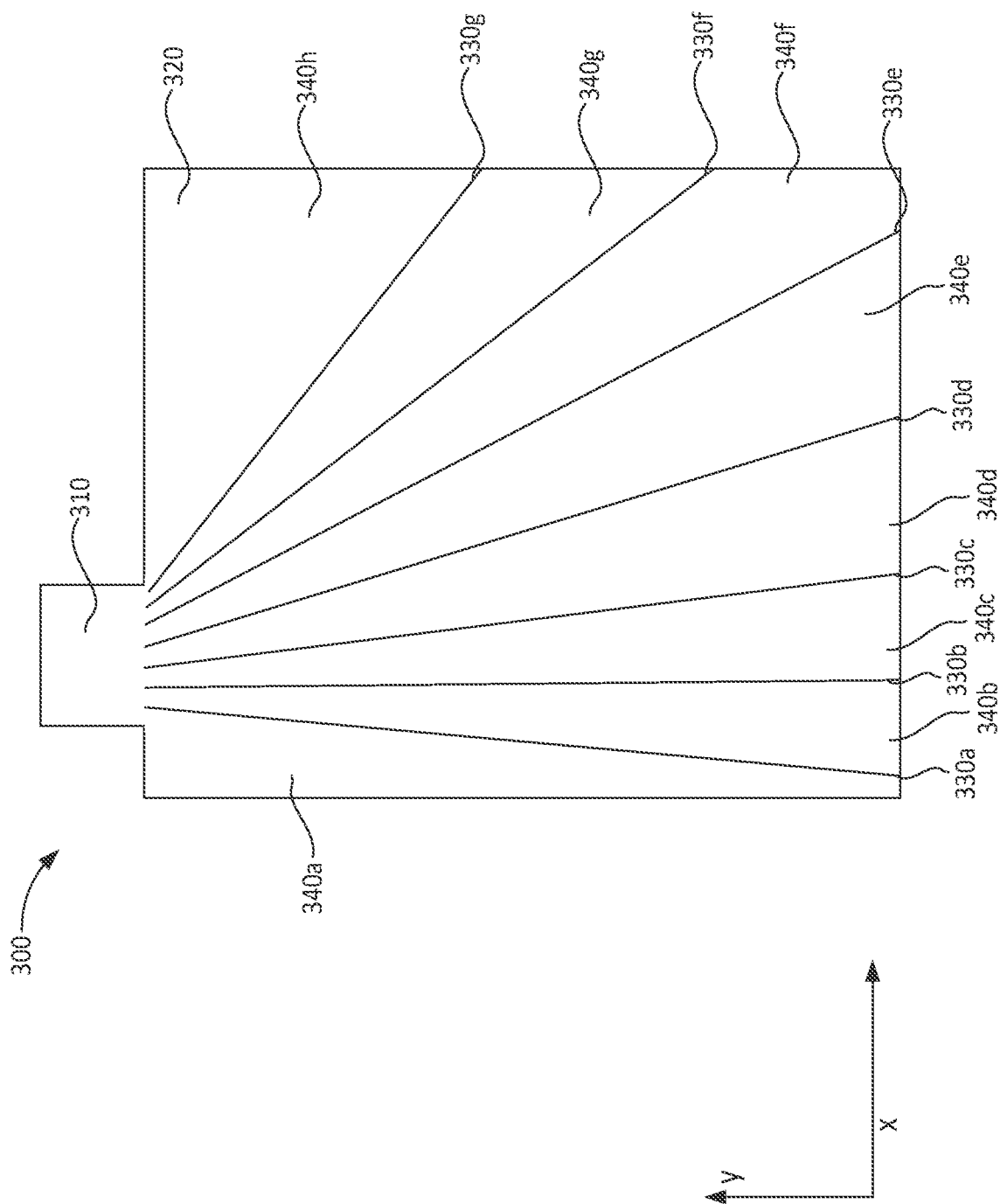
FIGS. 3A-3C are illustrations of a current collector with a short circuit thermal runaway prevention mechanism, according to an embodiment.
Figure 3B:
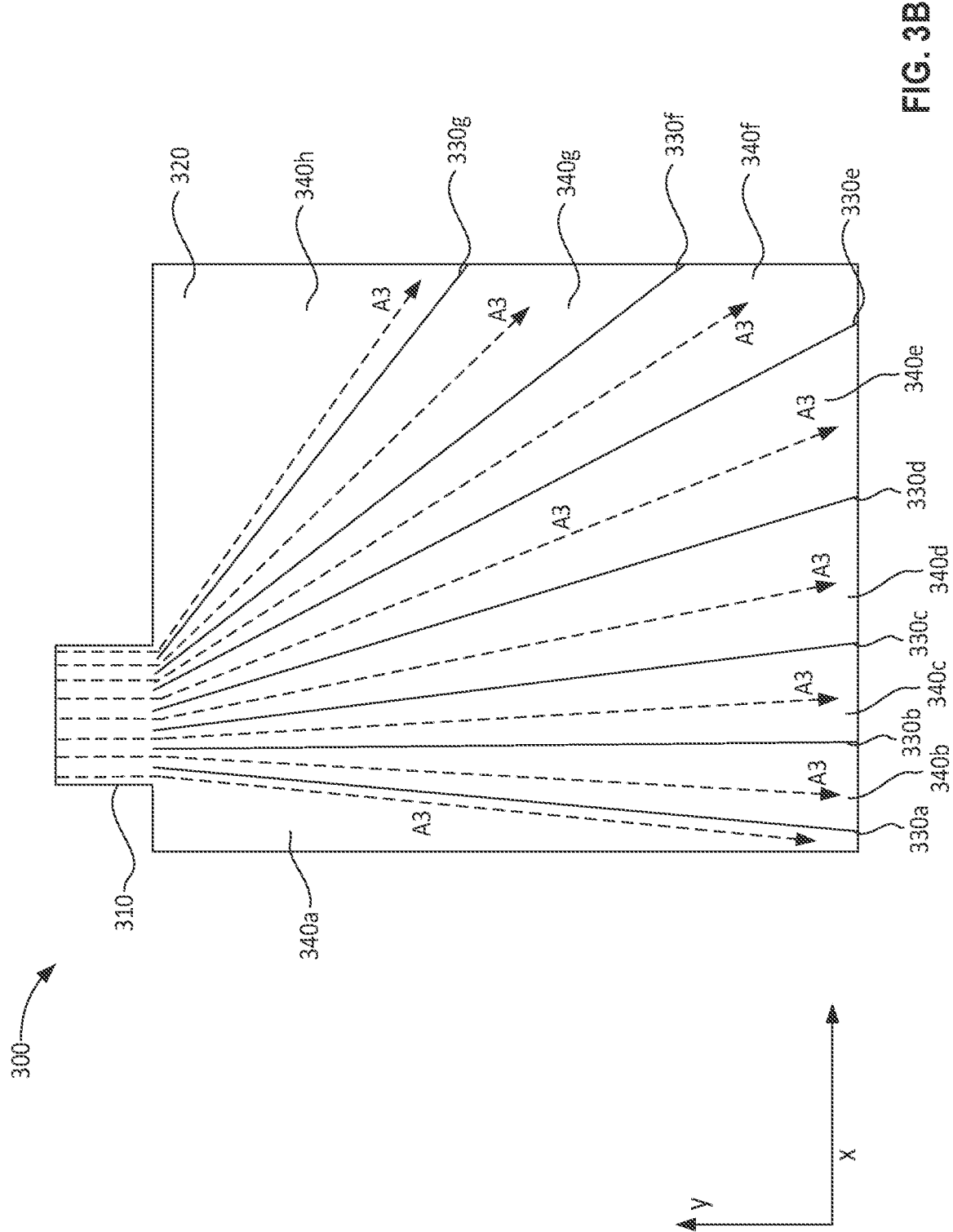
Figure 3C:
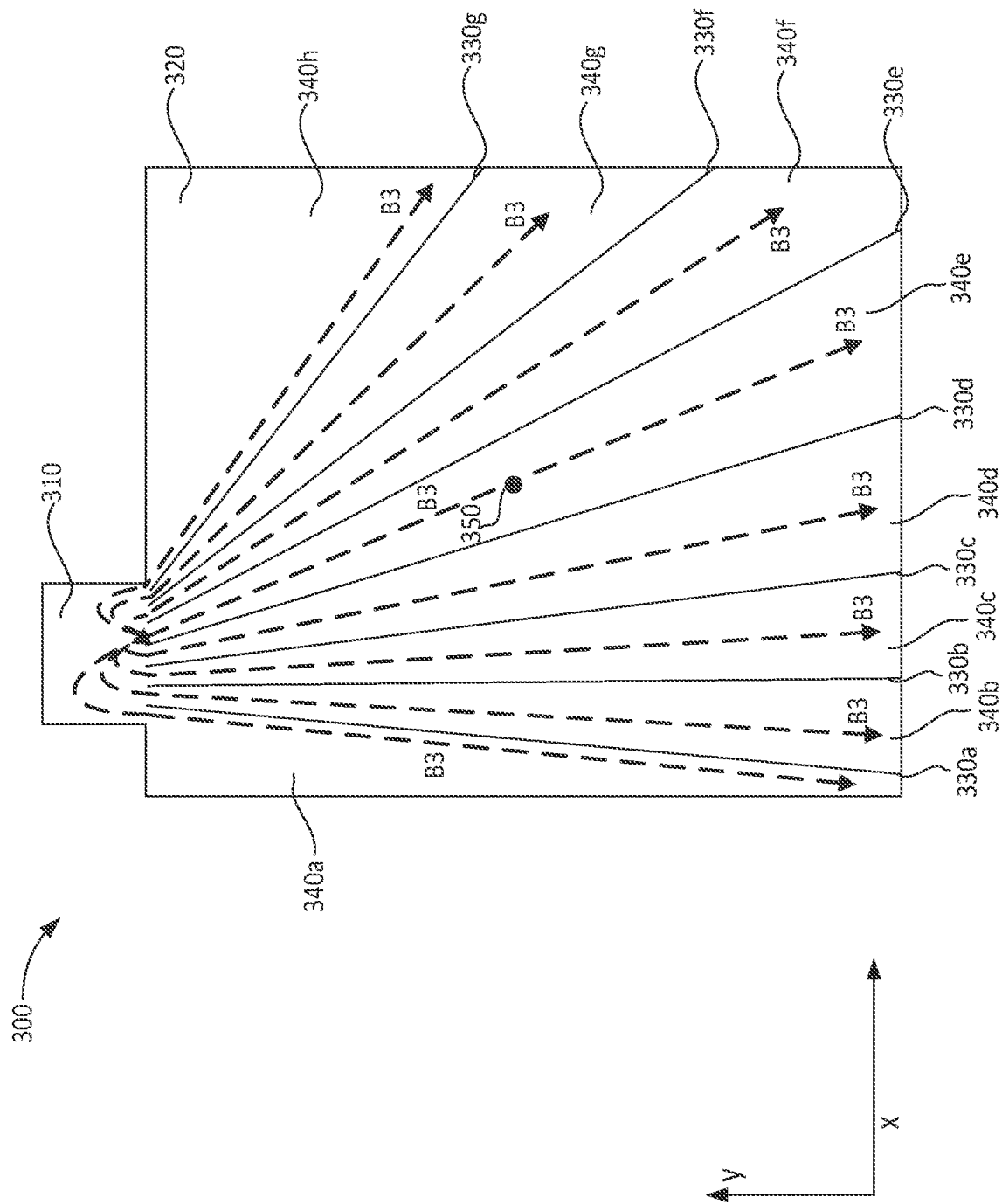

FIGS. 3A-3C show a current collector 300 of an electrochemical cell (not shown) with a short circuit thermal runaway prevention mechanism, according to an embodiment. The current collector 300 includes a connection region 310 and an electrode region 320. As shown, the electrode region 320 includes dividers 330a, 330b, 330c, 330d, 330e, 330f, 330g, (collectively referred to as dividers 330), which divide the electrode region into sub-regions 340a, 340b, 340c, 340d, 340e, 340f, 340g, 340h (collectively referred to as sub-regions 340). FIG. 3A shows the current collector 300 without a depiction of any electron movement. FIG. 3B shows the current collector 300 with a depiction of electron movement during the normal discharge of the electrochemical cell. As shown, the current collector 300 acts as a cathode current collector, as the electrons migrate from the anode and the anode current collector to the cathode and the cathode current collector, and then move through the current collector 300 along electron flow paths A3 (represented as dashed lines). FIG. 3C shows the current collector 300 subject to a short circuit event at an internal short circuit point 350. Since the electrons follow a path of least resistance, they are unable to traverse the dividers 330 and follow a much more circuitous path along electron flow paths B3 (represented as dashed lines) from the internal short circuit point 350. As shown, the dividers 330 direct most of the electron flow paths B3 from the internal short circuit point 350, through sub-region 340e, to the connection region 310, and then to the different sub-regions 340 of the electrode region 320. This circuitous path can create a bottlenecking effect that slows the flow of electrons from the short circuit point (and therefore the current through the electrochemical cell) and reduces temperature increase due to a short circuit event. Said another way, the resistivity of the current collector 300 is anisotropic and the dividers 330 can induce electrical resistance to limit current beyond the limits imposed by the ionic resistance of the electrochemical cell.

For reference, FIGS. 3A-3C include a coordinate plot with an x-axis and a y-axis. As shown, the current collector 300 is depicted with the connection region 310 at a higher y-value than electrode region 320. As shown, the dividers 330 are arranged vertically and diagonally. In some embodiments, the current collector 300 can include one or more dividers 330 that are arranged horizontally. In some embodiments, the dividers 330 can prohibit or substantially prohibit the movement of electrons in the x-direction with a constant y-value. In some embodiments, the dividers 330 can prohibit or substantially prohibit the movement of electrons in the y-direction with a constant x-value. As shown, the dividers 330 extend to the bottom edge of the electrode region 320. In some embodiments, the dividers 330 can stop short of extending to the bottom edge of the electrode region 320. As shown, the dividers 330 are arranged as a series of straight line cuts. In some embodiments, the dividers 330 can be in the form of semi-circle cuts, spiral cuts, or any other form factor to lengthen the electron flow paths B3 in the event of a short circuit.

In some embodiments, the current collector 300, the connection region 310, the electrode region 320, the dividers 330, and the sub-regions 340 can be the same or substantially similar to the current collector 200, the connection region 210, the electrode region 220, the dividers 230, and the sub-regions 240, respectively, as described above with reference to FIG. 2.

Figure 4A:
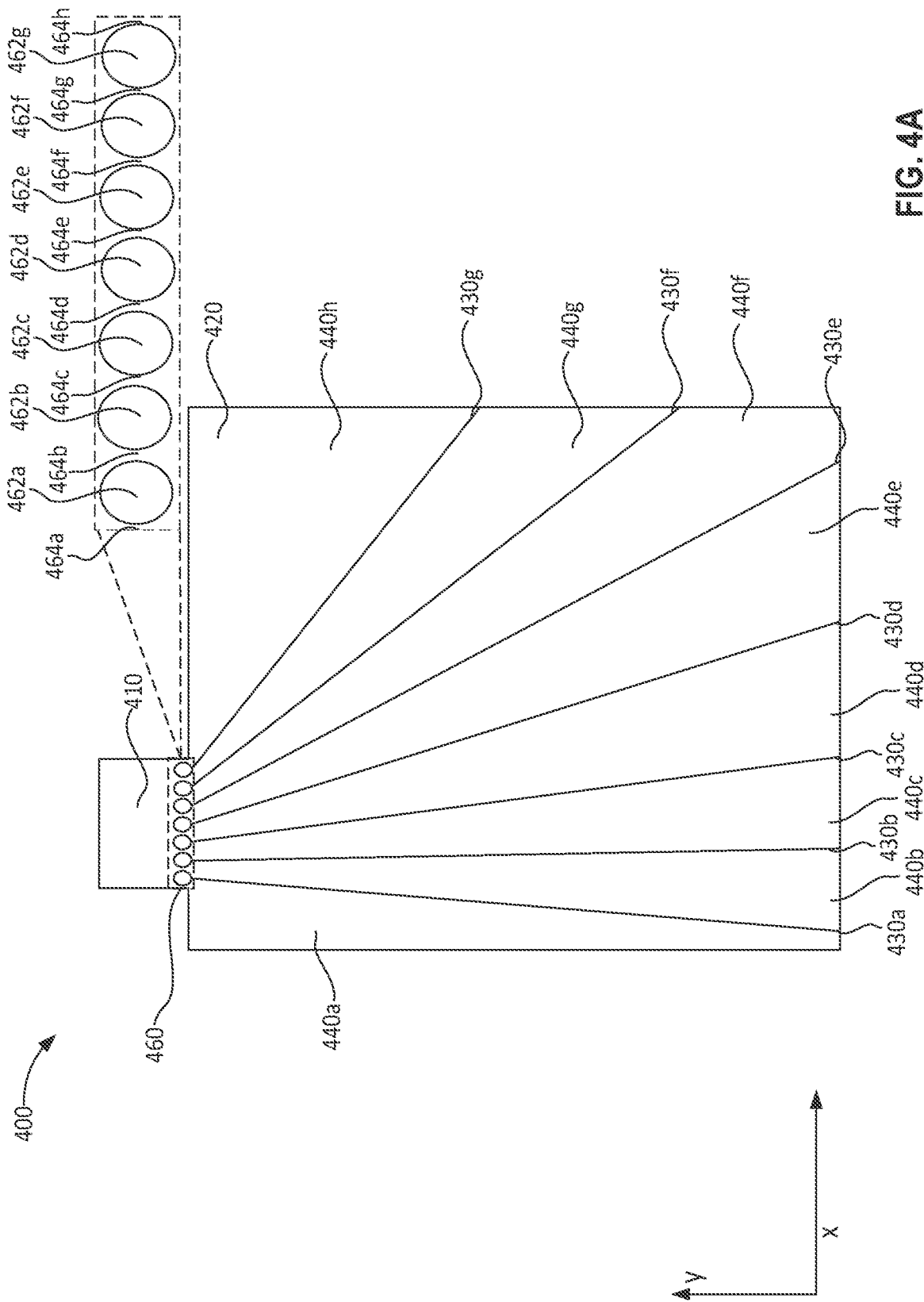
FIGS. 4A-4F are illustrations of a current collector with a short circuit thermal runaway prevention mechanism, according to an embodiment.
Figure 4B:
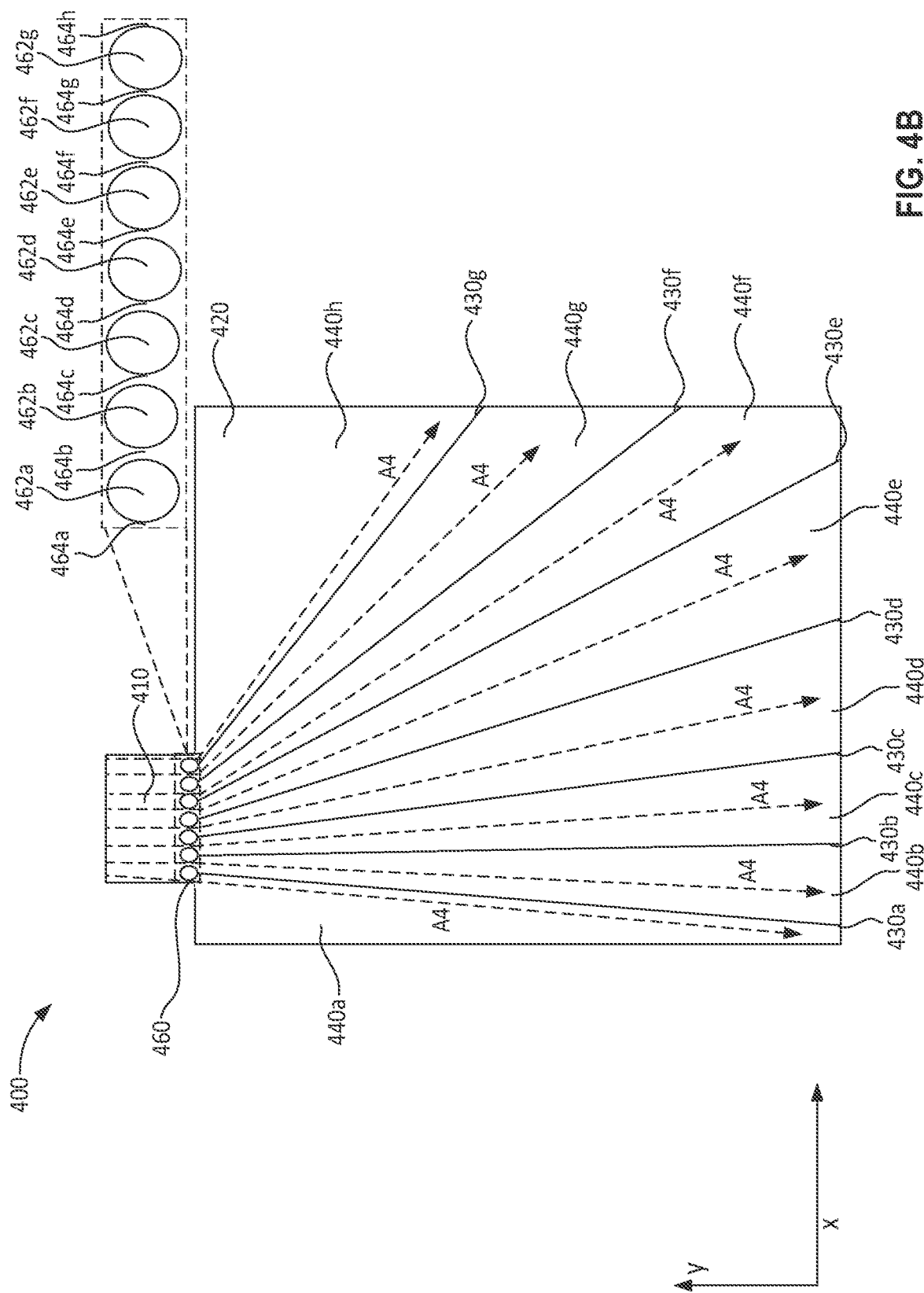

FIGS. 4A-4F show a current collector 400 of an electrochemical cell (not shown) with a short circuit thermal runaway prevention mechanism, according to an embodiment. The current collector 400 includes a connection region 410 and an electrode region 420. As shown, the electrode region 420 includes dividers 430a, 430b, 430c, 430d, 430e, 430f, 430g, (collectively referred to as dividers 430), which divide the electrode region into sub-regions 440a, 440b, 440c, 440d, 440e, 440f, 440g, 440h (collectively referred to as sub-regions 440). The current collector 400 includes a fuse section 460. The fuse section 460 includes holes 462a, 462b, 462c, 462d, 462e, 462f, 462g (collectively referred to as holes 462) and fuses 464a, 464b, 464c, 464d, 464e, 464f, 464g, 464h (collectively referred to as fuses 464). FIG. 4A shows the current collector 400 without a depiction of any electron movement. FIG. 4B shows the current collector 400 with a depiction of electron movement during the normal discharge of the electrochemical cell. As shown, the current collector 400 acts as a cathode current collector, as the electrons migrate from the anode and the anode current collector to the cathode to the cathode current collector, and then move through the current collector 400 along electron flow paths A4 (represented as dashed lines).

Figure 4C:
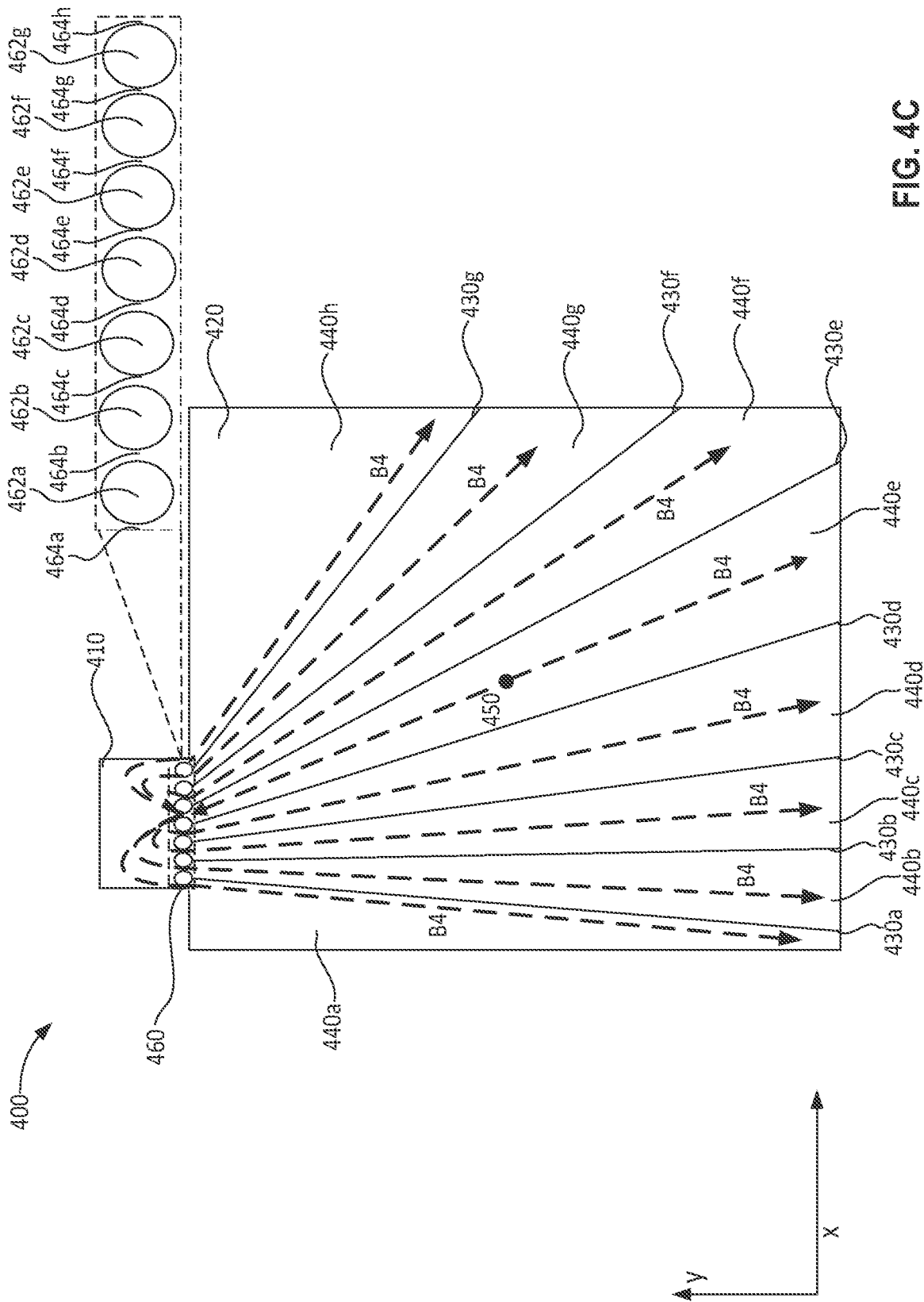
Figure 4D:
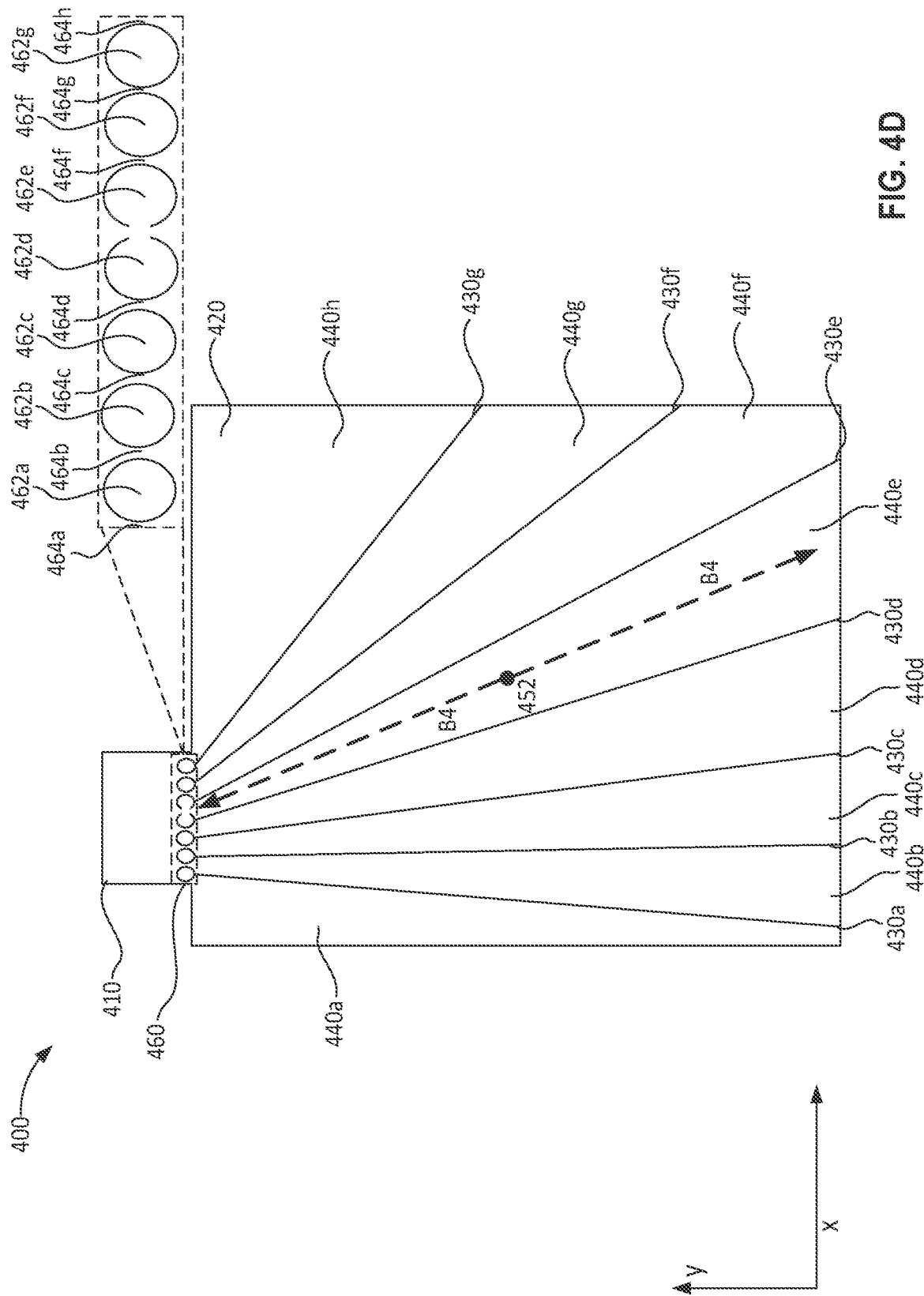

FIGS. 4C-4D show the current collector 400 subject to a short circuit event at an internal short circuit point 450. Since the electrons follow a path of least resistance, they are unable to traverse the dividers 430 and follow a much more circuitous path along electron flow paths B4 (represented as dashed lines) from the internal short circuit point 450. As shown in FIG. 4C, the dividers 430 direct most of the electron flow paths B4 from internal short circuit point 450, through the sub-region 440e, through the fuse 464e, to the connection region 410, and then back through the fuses 464a, 464b, 464c, 464d, 464f, 464g, and 464h to the sub-regions 440a, 440b, 440c, 440d, 440f, 440g, and 440h. In some embodiments, the fuses 464 can be formed via selective removal of portions of the current collector 400. In some embodiments, portions of the connection region 410 and/or the electrode region 420 can be selectively removed such that only thin portions of material remain to form the fuses 464. Electrons become bottlenecked as they move across the fuses 464 and the fuses 464 increase in temperature. The fuses 464 are substantially thin, such that they can increase in temperature faster than the bulk material of the current collector 400 as the electrons move from the internal short circuit point 450. As shown, the most significant electron traffic is across fuse 464e. In some embodiments, the temperature of fuse 464e increases faster than either of the other fuses 464, such that fuse 464e melts before either of the other fuses 464. FIG. 4D shows the current collector 400, after the temperature of fuse 464e has increased significantly enough, such that the fuse 464e has melted. As shown in FIG. 4D, the internal short circuit point 450 is substantially electronically isolated from each of the sub-sections 440 except for sub-section 440e. This significantly reduces the electrode area which is electrochemically activated and can significantly reduce any thermal runaway effect brought on by the short circuit event.

Figure 4E:
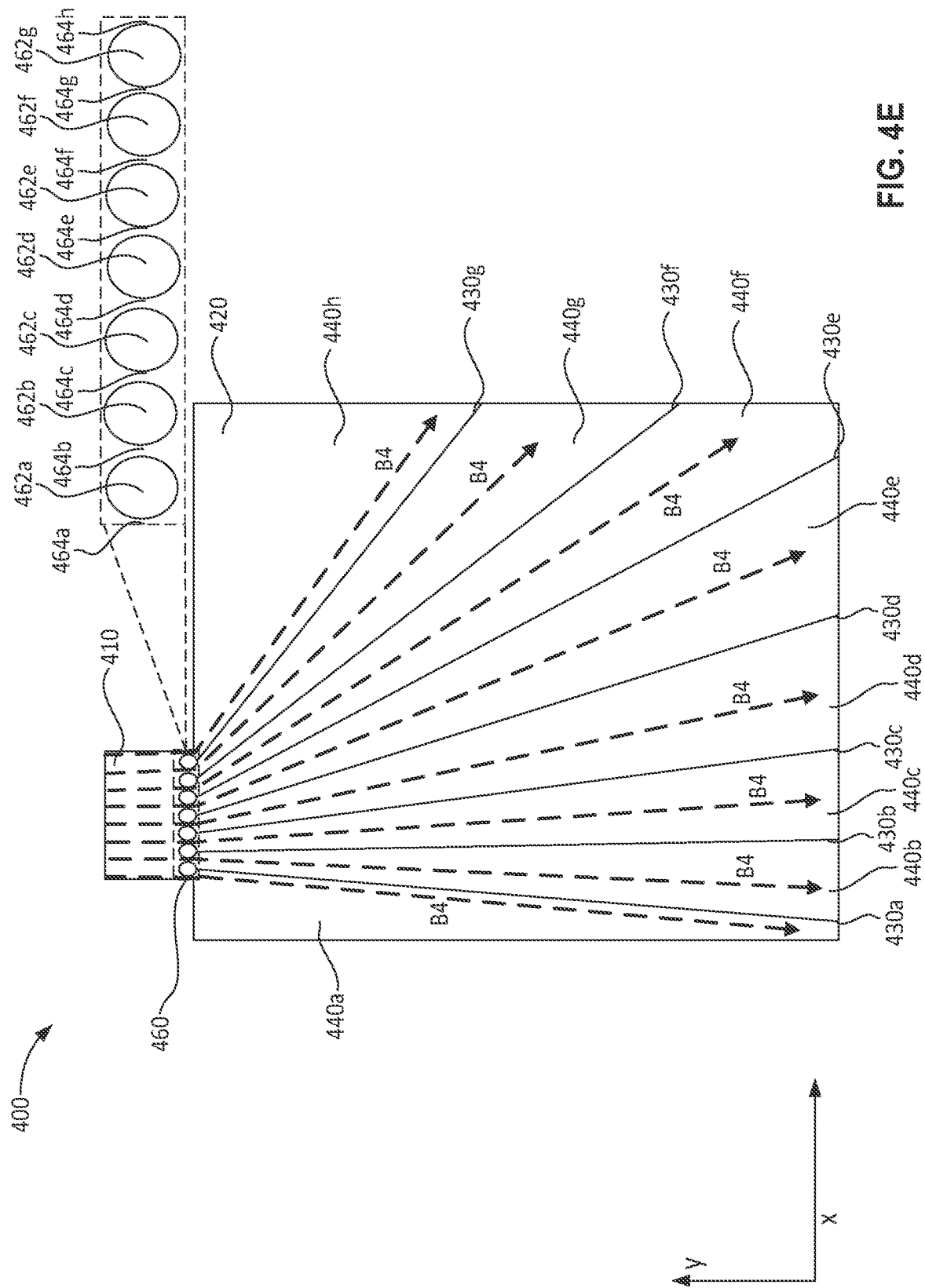
Figure 4F:
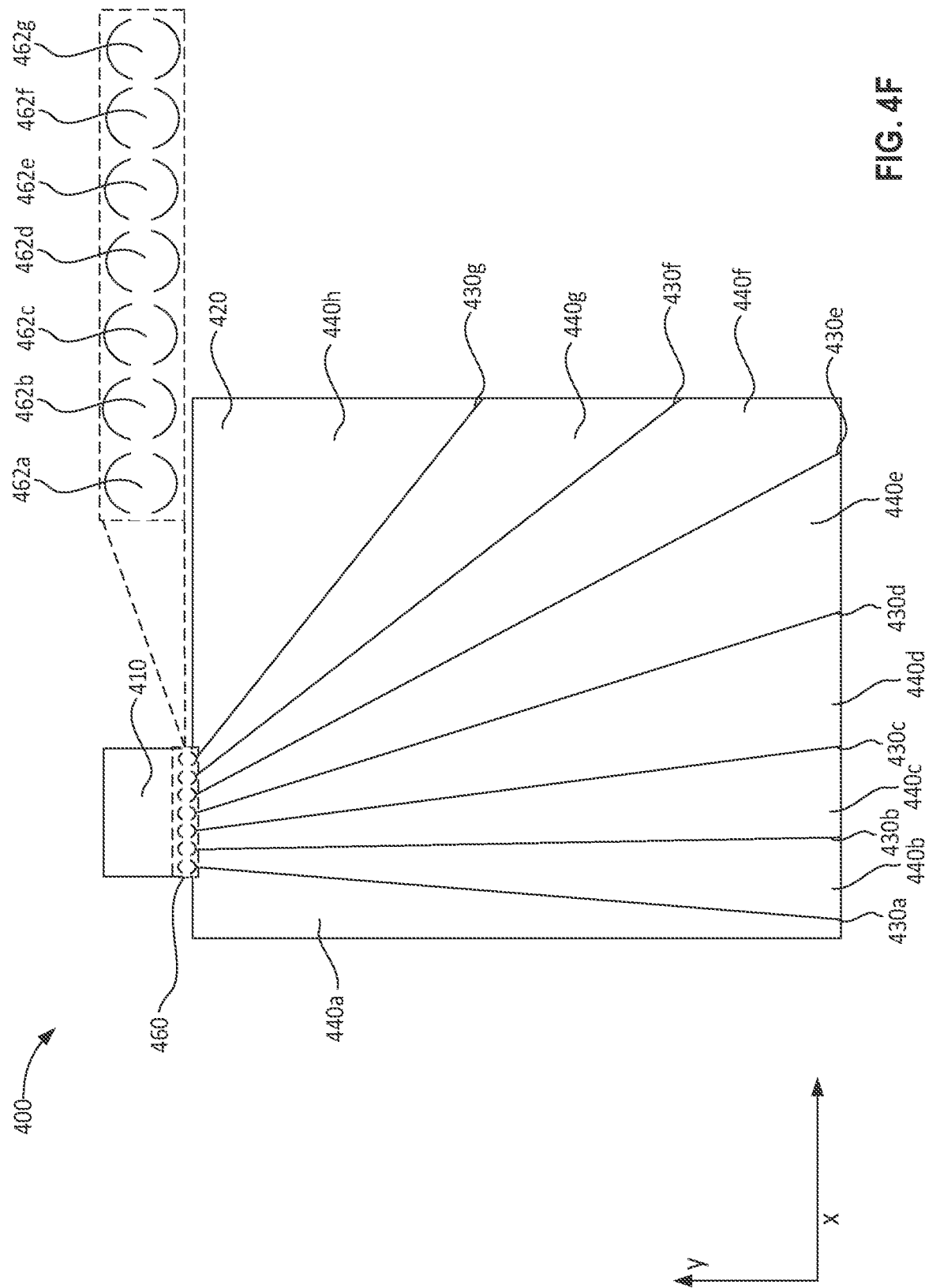

FIGS. 4E-4F show the current collector 400 subject to a short circuit event at an external short circuit. As shown, electrons follow a path of least resistance from the external short circuit. As shown in FIG. 4E, the dividers 430 direct most of the electron flow paths B4 from the external short circuit on the connection region 410 across the fuses 464 to the different sub-regions 440 of the electrode region 420. Electrons become bottlenecked as they move across the fuses 464 and the fuses 464 increase in temperature. The fuses 464 are substantially thin, such that they can increase in temperature faster than the bulk material of the current collector 400 as the electrons move from the external short circuit. FIG. 4F shows the current collector 400, after the temperature of each of the fuses 464 has increased significantly enough, such that each of the fuses 464 have melted. This isolates the connection region 410 from the electrode region 420, such that the electrochemical cell is disabled. Disabling the electrochemical cell by melting the fuses 464 can significantly reduce any thermal runaway effect brought on by the short circuit event. In some embodiments, at least one of the fuses 464 can melt. In some embodiments, a portion of the fuses 464 can melt. In some embodiments, all or substantially all of the fuses 464 can melt.

For reference, FIGS. 4A-4F include a coordinate plot with an x-axis and a y-axis. As shown, the current collector 400 is depicted with the connection region 410 at a higher y-value than electrode region 420. As shown, the dividers 430 are arranged vertically and diagonally. In some embodiments, the current collector 400 can include one or more dividers 430 that are arranged horizontally. In some embodiments, the dividers 330 can prohibit or substantially prohibit the movement of electrons in the x-direction with a constant y-value. In some embodiments, the dividers 430 can prohibit or substantially prohibit the movement of electrons in the y-direction with a constant x-value. As shown, the dividers 430 extend to the bottom edge of the electrode region 420. In some embodiments, the dividers 430 can stop short of extending to the bottom edge of the electrode region 420. As shown, the dividers 430 are arranged as a series of straight line cuts. In some embodiments, the dividers 430 can be in the form of semi-circle cuts, spiral cuts, or any other form factor to lengthen the electron flow paths B4 in the event of a short circuit.

In some embodiments, the holes 462 can be cut with a simple blade. In some embodiments, the holes 462 can be cut via die cutting, laser cutting, drilling, or any other subtractive processing techniques. In some embodiments, the holes 462 can be implemented in the current collector 400 via electrodeposition, silk screening, or any other suitable additive processing technique.

In some embodiments, each of the fuses 464 can have a width (i.e., along the x-axis) of at least about 50 µm, at least about 100 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 750 µm, at least about 800 µm, at least about 850 µm, at least about 900 µm, at least about 950 µm, at least about 1 mm, at least about 2 mm, at least about 3 mm, at least about 4 mm, at least about 5 mm, at least about 6 mm, at least about 7 mm, at least about 8 mm, at least about 9 mm, at least about 10 mm, at least about 11 mm, at least about 12 mm, at least about 13 mm, at least about 14 mm, at least about 15 mm, at least about 16 mm, at least about 17 mm, at least about 18 mm, or at least about 19 mm. In some embodiments, the fuses 464 can have a width of no more than about 20 mm, no more than about 19 mm, no more than about 18 mm, no more than about 17 mm, no more than about 16 mm, no more than about 15 mm, no more than about 14 mm, no more than about 13 mm, no more than about 12 mm, no more than about 11 mm, no more than about 10 mm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 950 µm, no more than about 900 µm, no more than about 850 µm, no more than about 800 µm, no more than about 750 µm, no more than about 700 µm, no more than about 650 µm, no more than about 600 µm, no more than about 550 µm, no more than about 500 µm, no more than about 450 µm, no more than about 400 µm, no more than about 350 µm, no more than about 300 µm, no more than about 250 µm, no more than about 200 µm, no more than about 150 µm, or no more than about 100 µm. Combinations of the above-referenced ranges for the width of each of the fuses 464 are also possible (e.g., at least about 50 µm and no more than about 20 mm or at least about 500 µm and no more than about 1 mm), inclusive of all values and ranges therebetween. In some embodiments, each of the fuses 464 can have a width of about 50 µm, about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm.

As shown, the fuse section 460 includes seven holes 462. In some embodiments, the fuse section 460 can include one hole 462, two holes 462, three holes 462, four holes 462, five holes 462, six holes 462, eight holes 462, nine holes 462, or ten holes 462. In some embodiments, the fuse section 460 can include at least about one hole 462, at least about two holes 462, at least about three holes 462, at least about four holes 462, at least about five holes 462, at least about six holes 462, at least about seven holes 462, at least about eight holes 462, at least about nine holes 462, at least about ten holes 462, at least about 20 holes 462, at least about 30 holes 462, at least about 40 holes 462, at least about 50 holes 462, at least about 60 holes 462, at least about 70 holes 462, at least about 80 holes 462, or at least about 90 holes 462. In some embodiments, the fuse section 460 can include no more than about 100 holes 462, no more than about 90 holes 462, no more than about 80 holes 462, no more than about 70 holes 462, no more than about 60 holes 462, no more than about 50 holes 462, no more than about 40 holes 462, no more than about 30 holes 462, no more than about 20 holes 462, no more than about ten holes 462, no more than about nine holes 462, no more than about eight holes 462, no more than about seven holes 462, no more than about six holes 462, no more than about five holes 462, no more than about four holes 462, no more than about three holes 462, or no more than about two holes 462. Combinations of the above-referenced number of holes 462 are also possible (e.g., at least about one hole 462 and no more than about 100 holes 462 or at least about five holes 462 and no more than about 50 holes 462), inclusive of all values and ranges therebetween. In some embodiments, the fuse section 460 can include about one hole 462, about two holes 462, about three holes 462, about four holes 462, about five holes 462, about six holes 462, about seven holes 462, about eight holes 462, about nine holes 462, about ten holes 462, about 20 holes 462, about 30 holes 462, about 40 holes 462, about 50 holes 462, about 60 holes 462, about 70 holes 462, about 80 holes 462, about 90 holes 462, or about 100 holes 462.

In some embodiments, the fuses 464 can include one or more thin strips of conductive material. As shown, the fuse section 460 includes eight fuses 464. In some embodiments, the fuse section 460 can include one fuse 464, two fuses 464, three fuses 464, four fuses 464, five fuses 464, six fuses 464, seven fuses 464, nine fuses 464, or ten fuses 464. In some embodiments, the fuse section 460 can include at least about one fuse 464, at least about two fuses 464, at least about three fuses 464, at least about four fuses 464, at least about five fuses 464, at least about six fuses 464, at least about seven fuses 464, at least about eight fuses 464, at least about nine fuses 464, at least about ten fuses 464, at least about 20 fuses 464, at least about 30 fuses 464, at least about 40 fuses 464, at least about 50 fuses 464, at least about 60 fuses 464, at least about 70 fuses 464, at least about 80 fuses 464, or at least about 90 fuses 464. In some embodiments, the fuse section 460 can include no more than about 100 fuses 464, no more than about 90 fuses 464, no more than about 80 fuses 464, no more than about 70 fuses 464, no more than about 60 fuses 464, no more than about 50 fuses 464, no more than about 40 fuses 464, no more than about 30 fuses 464, no more than about 20 fuses 464, no more than about 10 fuses 464, no more than about nine fuses 464, no more than about eight fuses 464, no more than about seven fuses 464, no more than about six fuses 464, no more than about five fuses 464, no more than about four fuses 464, no more than about three fuses 464, or no more than about two fuses 464. Combinations of the above-referenced number of fuses 464 are also possible (e.g., at least about one fuse 464 and no more than about 100 fuses 464 or at least about five fuses 464 and no more than about 50 fuses 464), inclusive of all values and ranges therebetween. In some embodiments, the fuse section 460 can include about one fuse 464, about two fuses 464, about three fuses 464, about four fuses 464, about five fuses 464, about six fuses 464, about seven fuses 464, about eight fuses 464, about nine fuses 464, about ten fuses 464, about 20 fuses 464, about 30 fuses 464, about 40 fuses 464, about 50 fuses 464, about 60 fuses 464, about 70 fuses 464, about 80 fuses 464, about 90 fuses 464, or about 100 fuses 464.

In some embodiments, the current collector 400, the connection region 410, the electrode region 420, the dividers 430, the sub-regions 440, and the fuse section 460 can be the same or substantially similar to the current collector 200, the connection region 210, the electrode region 220, the dividers 230, the sub-regions 240, and the fuse section 260, respectively, as described above with reference to FIG. 2. In some embodiments, the current collector 400, the connection region 410, the electrode region 420, the dividers 430, and the sub-regions 440 can be the same or substantially similar to the current collector 300, the connection region 310, the electrode region 320, the dividers 330, and the sub-regions 340, respectively, as described above with reference to FIG. 3.

Figure 5:
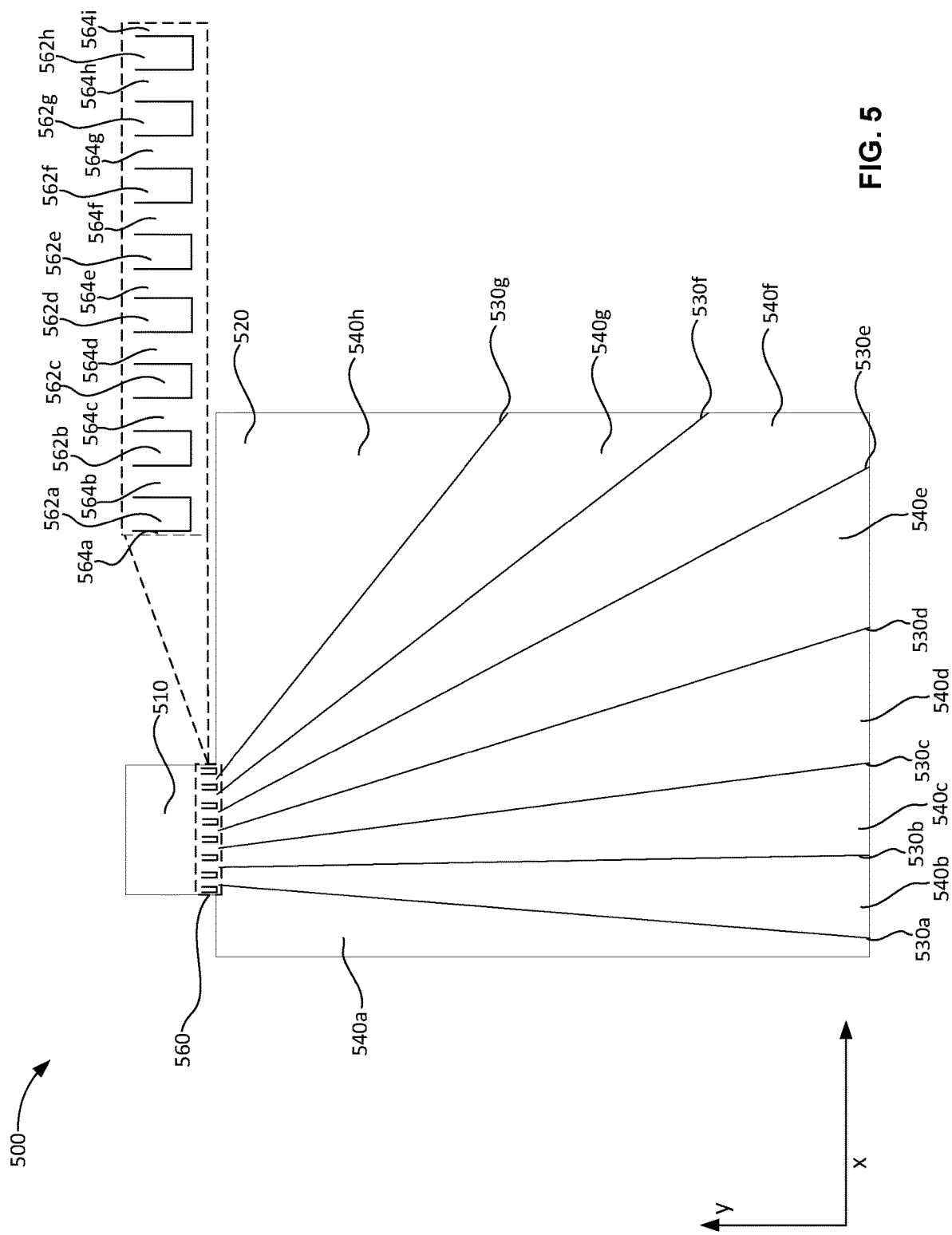
FIG. 5 is an illustration of a current collector with a short circuit thermal runaway prevention mechanism, according to an embodiment.

FIG. 5 shows a current collector 500 of an electrochemical cell (not shown) with a short circuit thermal runaway prevention mechanism, according to an embodiment. The current collector 500 includes a connection region 510 and an electrode region 520. As shown, the electrode region 520 includes dividers 530a, 530b, 530c, 530d, 530e, 530f, 530g, (collectively referred to as dividers 530), which divide the electrode region into sub-regions 540a, 540b, 540c, 540d, 540e, 540f, 540g, 540h (collectively referred to as sub-regions 540). The current collector 500 includes a fuse section 560. As shown, the dividers 530 can extend into the fuse section 560. In some embodiments, the dividers 530 can extend into the connection region 510. The fuse section 560 includes tabs 562a, 562b, 562c, 562d, 562e, 562f, 562g, 562h (collectively referred to as tabs 562) and fuses 564a, 564b, 564c, 564d, 564e, 564f, 564g, 564h (collectively referred to as fuses 564).

As shown, the tabs 562 are not removed from the current collector 500 but remain in place during operation of the electrochemical cell. In some embodiments, the tabs 562 can include cuts around an outside perimeter of a shape. In some embodiments, the shape can include a rectangle, an ellipse, a circle, a square, or any other form factor or combinations thereof. As shown, the tabs 562 include cuts that extend around three sides of a rectangle. In some embodiments, the tabs 562 can include cuts that extend around the entire perimeter of one or more shapes. In such cases, the material of the current collector 500 that makes up the tabs 562 can be held in place (e.g., via lamination, if the current collector 500 is laminated to an electrode material). Including cuts in the fuse section 560 without removing material from the current collector 500 can create a fuse geometry without physically removing pieces of the current collector 500. Such a geometry can create an electrical path that leads to fusing. By creating such a geometry of the tabs 562, the tabs 562 can be tuned to open at or approximately at a given level of electrical current. A specified geometry of the tabs 562 can also avoid the need to remove scraps of metal during the manufacturing of the current collector 500 and reduce the risk of scraps of metal entering the finished electrochemical cell (potentially causing a safety hazard). Additionally, the tabs 562 can reduce the cross sectional areas of the fuses created by the tabs 562 and prevent heat sinking to the fuse section 560 (i.e., promoting quicker fusing).

Figure 6:
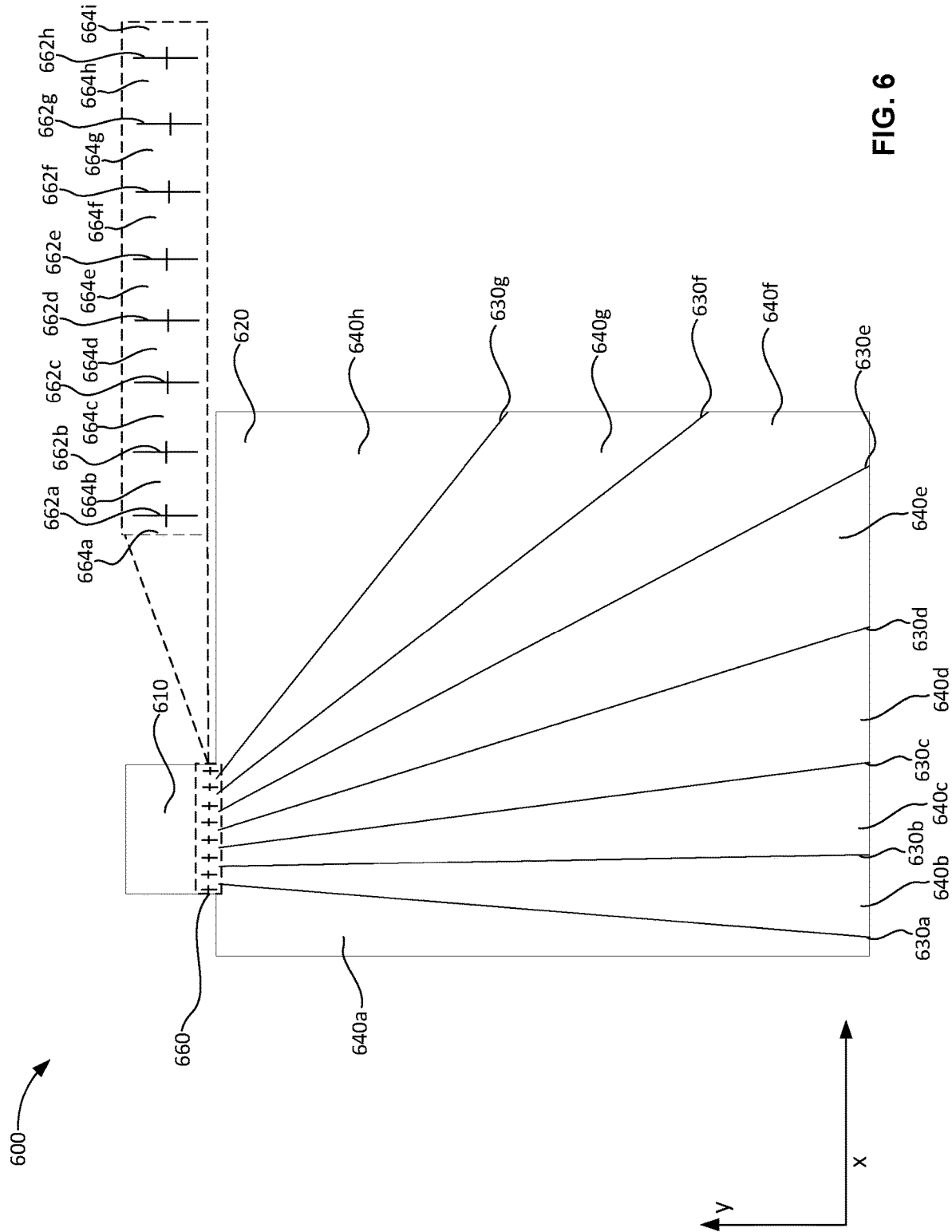
FIG. 6 is an illustration of a current collector with a short circuit thermal runaway prevention mechanism, according to an embodiment.

FIG. 6 shows a current collector 600 of an electrochemical cell (not shown) with a short circuit thermal runaway prevention mechanism, according to an embodiment. The current collector 600 includes a connection region 610 and an electrode region 620. As shown, the electrode region 620 includes dividers 630a, 630b, 630c, 630d, 630e, 630f, 630g, (collectively referred to as dividers 630), which divide the electrode region into sub-regions 640a, 640b, 640c, 640d, 640e, 640f, 640g, 640h (collectively referred to as sub-regions 640). The current collector 600 includes a fuse section 660. As shown, the dividers 630 can extend into the fuse section 660. In some embodiments, the dividers 630 can extend into the connection region 610. The fuse section 660 includes cuts 662a, 662b, 662c, 662d, 662e, 662f, 662g, 662h (collectively referred to as cuts 662) and fuses 664a, 664b, 664c, 664d, 664e, 664f, 664g, 664h (collectively referred to as fuses 664).

As shown, the cuts 662 have a plus or cross shape. In some embodiments, the cuts 662 can have a star shape, an X-shape, or any other suitable shape or combinations thereof. By using open shapes for the cuts 662, the cross section of the fuses created by the cuts 662 can be reduced without significantly interrupting heat sinking. This design can achieve a balance between quicker fusing and reduction of excessive heat buildup.

FIG. 7 shows a current collector 700 of an electrochemical cell (not shown) with a short circuit thermal runaway prevention mechanism, according to an embodiment. The current collector 700 includes a connection region 710 and an electrode region 720. As shown, the electrode region 720 includes dividers 730a, 730b, 730c, 730d, 730e, 730f, 730g, (collectively referred to as dividers 730), which divide the electrode region into sub-regions 740a, 740b, 740c, 740d, 740e, 740f, 740g, 740h (collectively referred to as sub-regions 740). The current collector 700 includes a fuse section 760. As shown, the dividers 730 extend into the connection region 710. Extending the dividers 730 into the connection region 710 can create bottlenecks for the electron flow. In some embodiments, the dividers 730 can extend into the connection region 710 by about 50 μm, about 100 μm, about 200 μm, about 300 μm, about 400 μm, about 500 μm, about 600 μm, about 700 μm, about 800 μm, about 900 μm, about 1 mm, about 2 mm, about 3 mm, about 4 mm, about 5 mm, about 6 mm, about 71 mm, about 8 mm, about 9 mm, about 1 cm, about 2 cm, about 3 cm, about 4 cm, or about 5 cm, inclusive of all values and ranges therebetween.

FIG. 8 shows an electrochemical cell 8000 with a short circuit thermal runaway prevention mechanism, according to an embodiment. The electrochemical cell 8000 includes an anode current collector 800 and a cathode current collector 900. The anode current collector 800 includes an anode connection region 810 and an anode region 820. The cathode current collector 900 includes a cathode connection region 910 and a cathode region 920. An anode material 805 is disposed on the anode region 820 of the anode current collector 800. A cathode material 905 is disposed on the cathode region 920 of the cathode current collector 900. A separator 870 is disposed between the anode material 805 and the cathode material 905. As shown, a short circuit inducer 856 induces an anode internal short circuit point 850 and a cathode internal short circuit point 950.

In some embodiments, the anode current collector 800 can be a segmented current collector that can aid in preventing thermal runaway in the electrochemical cell 8000. In some embodiments, the cathode current collector 900 can be a segmented current collector that can aid in preventing thermal runaway in the electrochemical cell 8000. In some embodiments, both the anode current collector 800 and the cathode current collector 900 can both be segmented current collectors that can aid in preventing thermal runaway in the electrochemical cell 8000. In some embodiments, the anode current collector 800 can be the same or substantially similar to the current collector 200, the current collector 300, the current collector 400, the current collector 500, the current collector 600, the current collector 700, as described above with reference to FIG. 2, FIGS. 3A-3C, FIGS. 4A-4F, FIG. 5, FIG. 6, or FIG. 7, respectively. In some embodiments, the cathode current collector 800 can be the same or substantially similar to the current collector 200, the current collector 300, the current collector 400, the current collector 500, the current collector 600, or the current collector 700, as described above with reference to FIG. 2, FIGS. 3A-3C, FIGS. 4A-4F, FIG. 5, FIG. 6, or FIG. 7 respectively.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A device, comprising:
a substantially planar conductive material including a connection region and an electrode region, the electrode region including a divider defining a plurality of electron flow paths, the plurality of electron flow paths including a first electron flow path and a second electron flow path, the plurality of electron flow paths configured to direct the flow of electrons from the electrode region to the connection region; and
a fuse section disposed between the electrode region and the connection region, the fuse section defining an opening in the conductive material, the opening adjoined to an end of the divider,
wherein the device is configured to transition from a first configuration in which the first electron flow path and the second electron flow path are parts of the same piece of material to a second configuration in which the first electron flow path and the second electron flow path are not parts of the same piece of material.

2. The device of claim 1, wherein the fuse section includes a thin strip of conductive material.

3. The device of claim 2, wherein the thin strip of the conductive material melts at temperatures greater than about 200° C.

4. The device of claim 3, wherein the melting of the thin strip of the conductive material at least partially inhibits electron flow between the connection region and the electrode region.

5. The device of claim 2, wherein the thin strip of conductive material has widths between about 50 μm and about 1 mm.

6. The device of claim 1, wherein the substantially planar conductive material has an x-axis and a y-axis, and the plurality of dividers substantially prohibits the movement of electrons in the x-direction with a constant y-value.

7. The device of claim 1, wherein an average temperature of the device increases by less than about 25° C. during a short circuit event.

8. The device of claim 1, wherein each of the plurality of electron flow paths are on a sub-region of the electrode region, each of the sub-regions not directly coupled to each other.

9. The device of claim 1, wherein the electrode region includes a plurality of dividers.

10. An electrochemical cell, comprising:
an anode current collector having a connection region, an electrode region, the electrode region including a divider, the divider dividing the electrode region into a plurality of sub-regions, the plurality of sub-regions including a first sub-region and a second sub-region, the anode current collector further including a fuse section, the fuse section including a thin strip of conductive material and defining an opening, the opening adjoined to the divider such that the thin strip of conductive material is continuous with the first sub-region;
an anode disposed on the anode current collector;
a cathode current collector having a left side and a right side;
a cathode disposed on the cathode current collector; and
a separator disposed between the anode and the cathode,
wherein the anode current collector is configured to transition from a first configuration in which the first sub-region is coupled to the second sub-region to a second configuration in which the first sub-region is not coupled to the second sub-region.

11. The electrochemical cell of claim 10, wherein the connection region is directly coupled to the plurality of sub-regions.

12. The electrochemical cell of claim 10, wherein the fuse section adjoins the connection region and the electrode region.

13. The device of claim 10, wherein the thin strip of the conductive material melts at temperatures greater than about 200° C.

14. The electrochemical cell of claim 10, wherein an average temperature of the device increases by less than about 25° C. during a short circuit event.

15. The electrochemical cell of claim 10, wherein the electrode region includes a plurality of dividers.

16. The device of claim 1, wherein the divider is continuous.

17. The electrochemical cell of claim 10, wherein the divider is continuous.

18. A device, comprising:
a substantially planar conductive material, the substantially planar conductive material including:
a connection region;
an electrode region including a continuous divider defining a first electron flow path and a second electron flow path, the first electron flow path and the second electron flow path configured to direct the flow of electrons from the electrode region to the connection region; and
a fuse section including a thin strip of conductive material, the fuse section defining an opening in the substantially planar conductive material, the opening adjoined to the continuous divider such that the first electron flow path includes the thin strip of conductive material.

19. The device of claim 18, further comprising:
a fuse section disposed between the electrode region and the connection region.

* * * * *